(12) United States Patent
Neu

(10) Patent No.: US 7,303,063 B2
(45) Date of Patent: Dec. 4, 2007

(54) SEQUENTIAL STEPPED MOVEMENT STAGING DEVICE

(76) Inventor: Franklin D. Neu, 18210 Carmel Dr., Castro Valley, CA (US) 94546

( * ) Notice: Subject to any disclaimer, the term of this patent is extended or adjusted under 35 U.S.C. 154(b) by 260 days.

(21) Appl. No.: 11/280,075

(22) Filed: Nov. 15, 2005

(65) Prior Publication Data
US 2007/0108022 A1 May 17, 2007

(51) Int. Cl.
*B65G 19/00* (2006.01)
(52) U.S. Cl. .............. 198/717; 198/345.3; 414/222.06; 901/18
(58) Field of Classification Search ............ 198/345.1, 198/345.3, 717, 718, 722, 723, 737, 743, 198/746; 414/222.04, 222.06; 901/18
See application file for complete search history.

(56) References Cited

U.S. PATENT DOCUMENTS

| | | | | |
|---|---|---|---|---|
| 3,917,053 A | * | 11/1975 | Matsuyama | 198/718 |
| 4,381,860 A | * | 5/1983 | Silverberg | 271/120 |
| 4,585,226 A | * | 4/1986 | LaBate | 271/264 |
| 5,361,186 A | | 11/1994 | Tanie et al. | |
| 5,363,785 A | * | 11/1994 | Conley, Jr. | 112/470.06 |
| 5,484,031 A | | 1/1996 | Koyachi et al. | |
| 5,762,153 A | | 6/1998 | Zamagni | |
| 6,286,386 B1 | * | 9/2001 | Spletzer et al. | 74/490.01 |
| 6,491,119 B1 | | 12/2002 | Neu | |
| 2001/0054518 A1 | | 12/2001 | Buehler et al. | |

* cited by examiner

*Primary Examiner*—Mark A. Deuble
(74) *Attorney, Agent, or Firm*—Brian Beverly; Beeson Skinner Beverly, LLP

(57) ABSTRACT

A sequential stepped movement staging device comprises six legs 70 of equal length extending radially from a central sphere 46 in an X-Y-Z orthogonal relationship. The sphere 46 and legs 70 are held in a horizontally fixed position relative to a support surface 14 by a holder including a primary retaining member 40, a secondary retaining member 74 fixed in superposition to the primary retaining member 40, and an alignment cylinder 84. The secondary retaining member 74 is slidably disposed in the alignment cylinder 84 to allow for vertical movement of the sphere 46, legs 70, and retaining members 40, 74. One of six actuating rods 94 pushes down on one of three upwardly extending legs 70H thereby rotating the sphere 46 and causing two of three downwardly descending legs 70L to move a work surface 16 capable of horizontal sliding movement over the support surface 14 from a first position to a second position. In one embodiment of the invention shown in FIG. 12, a hydraulic feedback system maintains downward pressure on the sphere 130 via a central piston shaft 174 during the second half of a step.

22 Claims, 22 Drawing Sheets

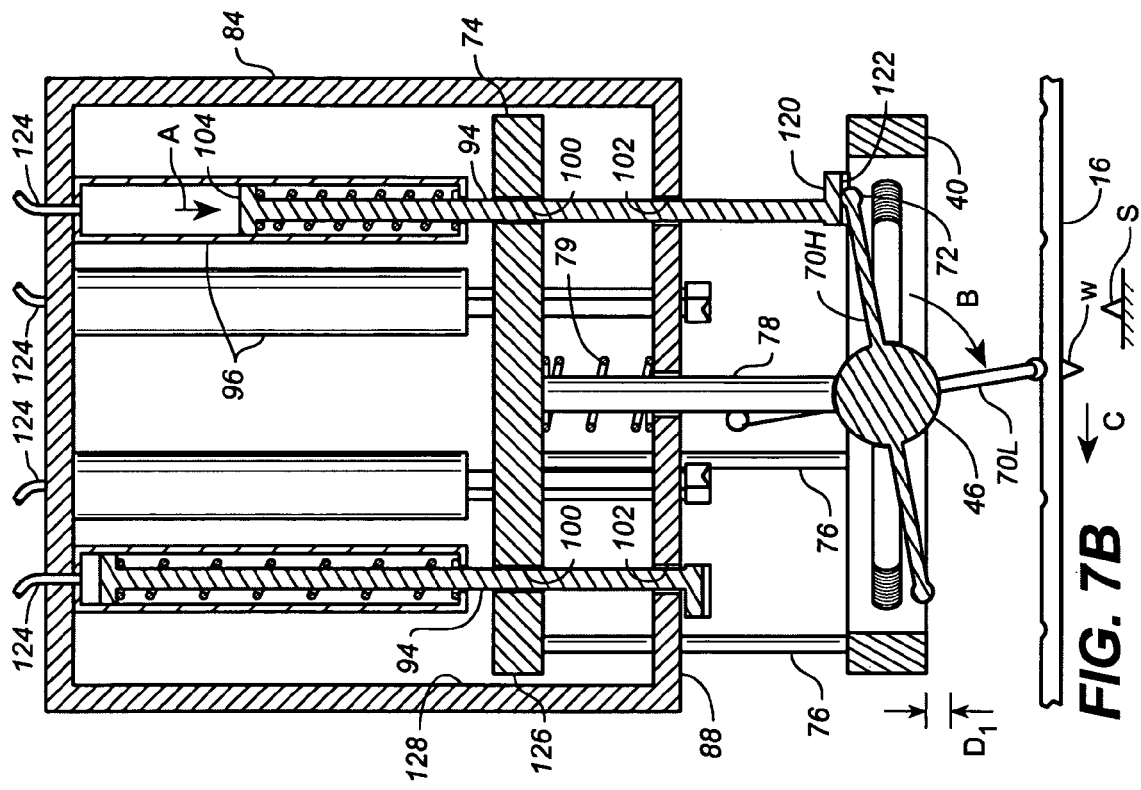
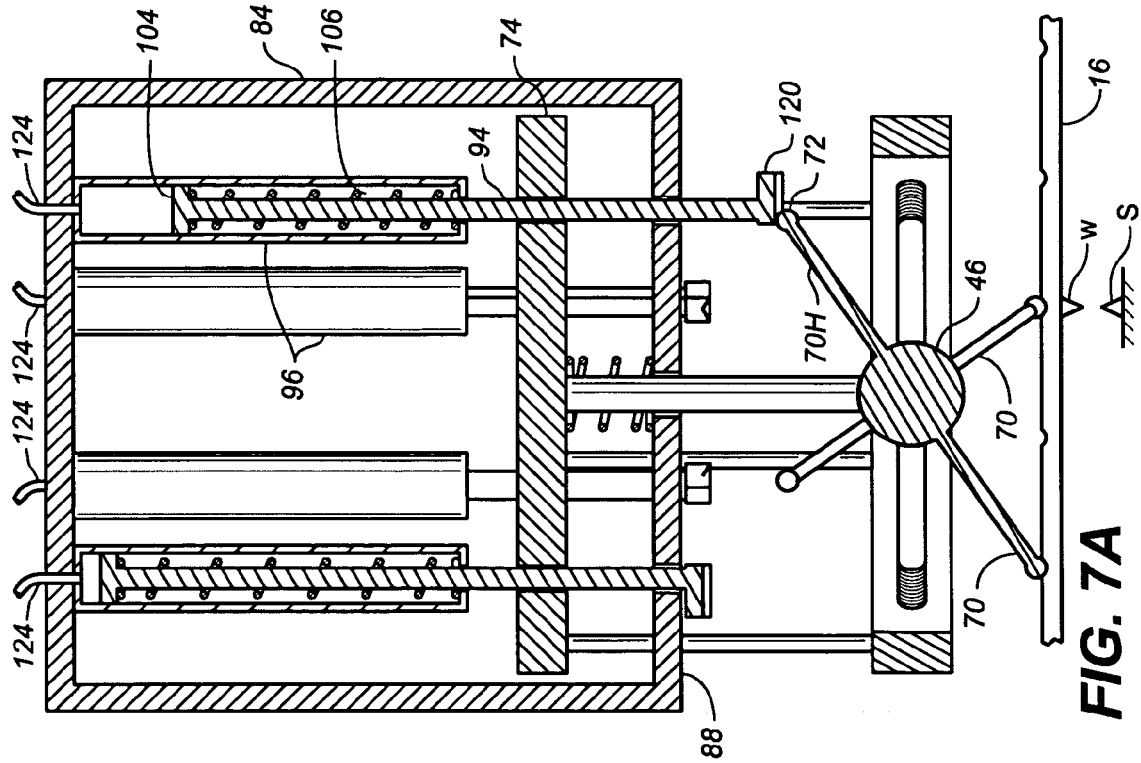
FIG. 7B
FIG. 7A

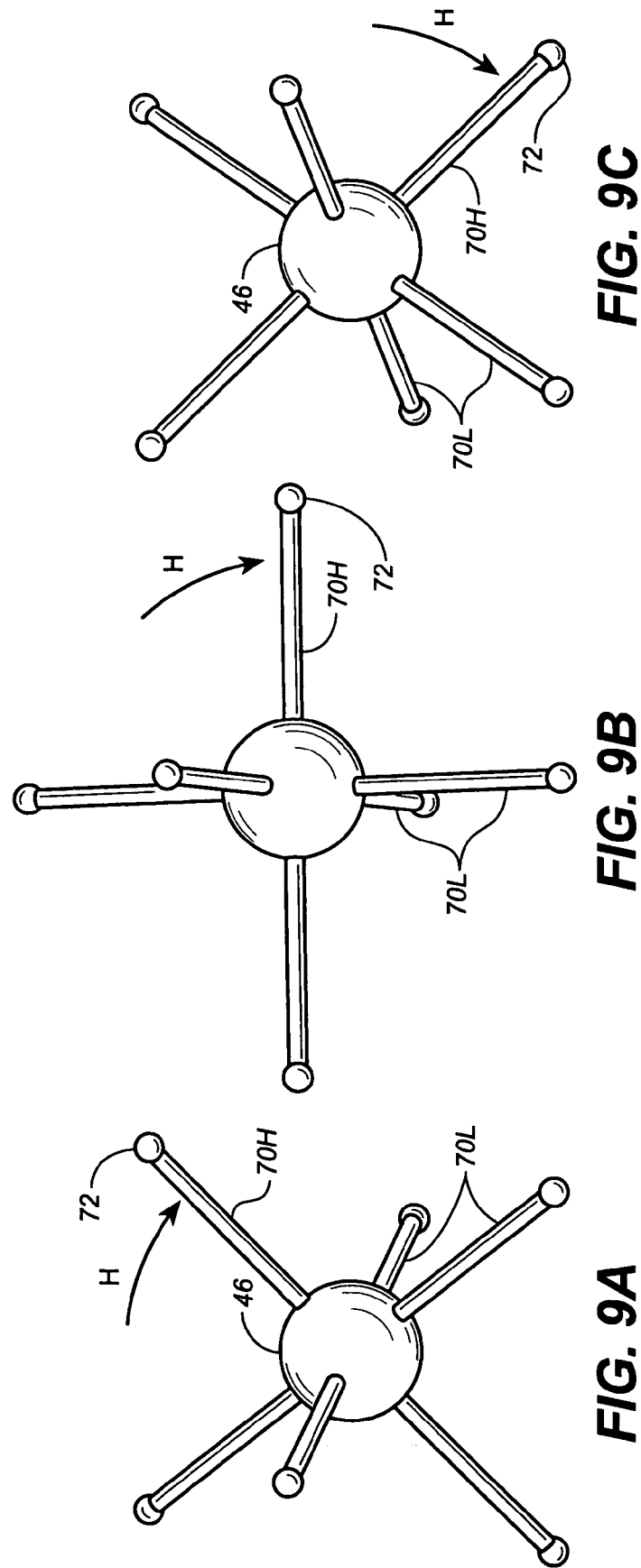

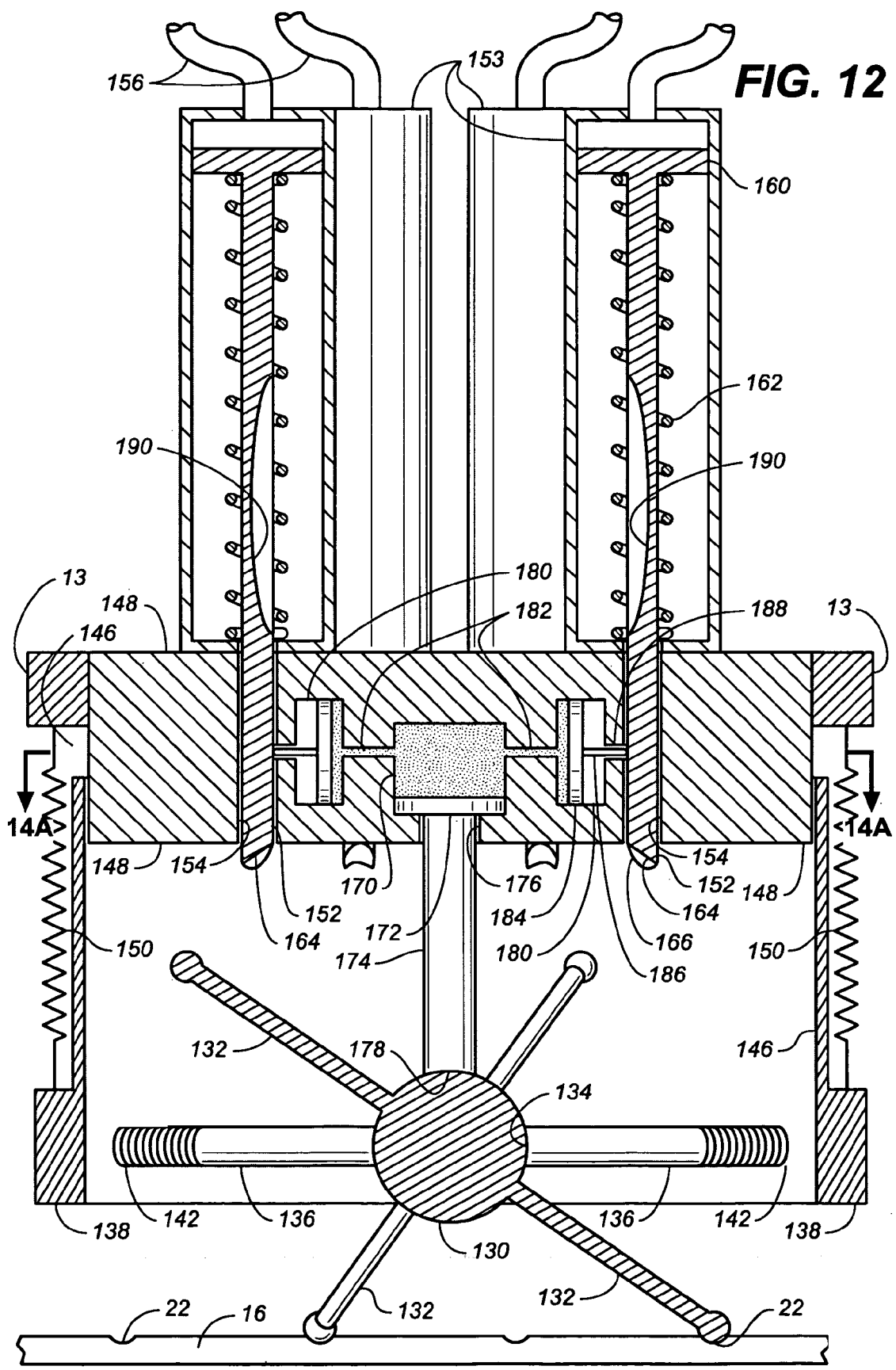

SEQUENTIAL STEPPED MOVEMENT STAGING DEVICE

BACKGROUND OF THE INVENTION

1. Field of the Invention

This invention relates to sequential stepped movement staging devices, and particularly to automated sequential stepped movement devices having six legs of equal length organized in an X-Y-Z orthogonal relationship extending radially from a horizontally fixed central sphere, wherein movement of an underlying work surface is accomplished by stepped rotation of the legs so that the ends of the legs act on an array of upwardly facing dimples in the work surface to walk the work surface from a first position at the beginning of a step to a second position at the end of a step.

2. Description of the Related Art

The typical X-Y axis staging device includes a first lead screw in the X axis and a second lead screw in the Y axis. A first motor drives the X-axis lead screw and a second motor drives the Y-axis lead screw. Each axis usually has an encoder to translate the rotation of the lead screw into an exact position along that axis. Each motor requires drive electronics. Such devices have application in the semiconductor and pharmaceutical industries where a task must be repetitively performed on a large number of identical objects, e.g., applying an etching pattern to a semiconductor wafer, performing a chemical analysis, or combining drugs into a beneficial compound. This type of stepped movement staging device is structurally complex and expensive even when its function is limited to stepping a fixed distance in either or both axes. If the device is required to operate in a vacuum or liquid environment, the equipment becomes much more complex and expensive.

There is therefore a need for a sequential stepped movement staging device that is structurally simpler, less expensive to manufacture, and able to function in severe environments.

SUMMARY OF THE INVENTION

A sequential stepped movement staging device according to the invention comprises a set of six legs of approximately equal length extending radially from a central sphere in an X-Y-Z orthogonal relationship. Each leg is provided with a ball-shaped distal end. A holder rotatably retains the sphere in a horizontally fixed location above a support surface. A work surface is capable of sliding horizontal movement over the support surface. The work surface includes at least one array of upwardly facing dimples each having a concave surface corresponding with the convex outer surface of the ball ends of the legs. In one aspect of the invention, the work surface has a single array of dimples. In other embodiments, the work surface may have a plurality of arrays of dimples providing an interleaved set of patterns from which to select for movement of the work surface. In a rest position the ends of three legs extending downwardly from the sphere are indexed in three of the dimples of the array. The three remaining legs extend upwardly from the sphere. By pushing down on a selected one of the three upwardly extending legs, the downwardly-extending legs can be moved in any of three directions inversely coincident with the horizontal orientation of the three upwardly-extending legs. Pushing down on the selected leg causes it initially to move down vertically and outward horizontally, thereby rotating the sphere and causing the two lower legs positioned directly beneath the selected high leg at the beginning of the step to walk in a horizontal direction opposite to the initial horizontal direction of movement of the selected high leg. Therefore, the horizontal movement of the lower legs causes the distal ends of the lower legs positioned in the dimples to move the work surface from a first position in which a first set of these legs are indexed in the dimples of the work surface to a second position in which a second set of three legs are indexed in the dimples.

Downward movement of the upwardly extending legs is effected by pressing down on the selected leg with the foot of one of six horizontally retained, vertically slidable actuating rods superposed above the upper legs. A downwardly facing groove on the lower surface of each foot maintains sliding contact with the leg during downward movement of the leg from the beginning to the end of a step. Each actuating rod has a rectilinear cross-section and is slidably held in a guide hole having a rectilinear cross-section such that the actuating rod is prevented from twisting about its longitudinal axis. The foot is thereby also prevented from twisting so that it holds the selected leg in a vertical plane throughout its downward movement. The restriction of the selected leg to movement only in a vertical plane works in cooperation with horizontal retention of the sphere to prevent the two lower legs from rotating about a vertical axis while they are walking under the sphere. The work surface is thereby also held against twisting movement during each step.

The work surface is moveable in any one of three initial directions offset from each other by 120° defined by the initial horizontal orientation of the three high legs. Movement through a second step is identical to movement through the first step, except that the three directions of movement available for the second step are offset by sixty degrees from the directions of movement of the first step. Subsequent steps of movement proceed in directions alternating between the first three directions of movement of the first step and the second set of three directions of the second step.

The holder comprises an annular primary retaining member having a plurality of inwardly-extending arms mutually disposed in a horizontal plane. The inner ends of the arms each have an inwardly-facing concave surface corresponding with the outer surface of the sphere such that the sphere is rotatably horizontally retained between the inner ends of the arms. A secondary retaining member is fixed in parallel superposition to the primary retaining member with a plurality of guide rods disposed about the periphery of the primary and secondary retaining members. In one aspect of the invention, the secondary retaining member is slidably retained in an alignment cylinder having an interior diameter slightly larger than the outer diameter of the secondary retaining member. A lower horizontal wall of the alignment cylinder forms a guide plate which is vertically interposed between the primary and secondary retaining members. The guide rods joining the primary and secondary retaining members extend through a plurality of bores in the guide plate to horizontally retain the primary and secondary members with respect to the guide plate. A set of six actuating rods are slidably retained in six openings in the secondary retaining member, and extend further through six cooperating guide holes in the guide plate such that each actuating rod is slidably retained by the secondary retaining member and guide plate.

A center-bearing member depends from the secondary retaining member, and extends through a center hole in the guide plate to the sphere. A lower end of the center-bearing member, having a concave curvature conforming to the convex outer surface of the sphere, rests on top of the sphere in sliding contact with its outer surface. A spring coiled around the center-bearing member between the guide plate and secondary retaining member is compressed to relieve some of the stress of the bearing member on the sphere. During each step, the walking movement of the two lower legs underneath the sphere causes the sphere and all the legs to rise and fall as they rotate since they are retained in a fixed horizontal position. Accordingly, the primary and secondary retaining members also rise and fall during a step in unison with the sphere and legs they retain.

In another aspect of the invention, a hydraulic feedback system maintains controlled downward pressure on the sphere sufficient to prevent the lower legs of the sphere from tending to jump out of the dimples in the work surface during movement of the work surface through a step. A central hydraulic chamber in the guide plate includes a vertically movable central piston. A lower end of a central piston shaft depending from the central piston, similar to the center bearing member in the embodiment described above, rests on top of and in sliding contact with the outer surface of the sphere. Six satellite chambers are arranged around and in hydraulic communication with the central chamber. Each satellite chamber has a satellite piston and a satellite piston shaft extending outwardly from the piston. The end of each satellite piston shaft is in sliding contact with one of the six actuating rods, each actuating rod having an inwardly-facing lateral recess having an arced profile. As the sphere is rotated through a step, it moves from a rest height at the beginning of the step to an intermediate height which varies while the sphere is being rotated from the beginning to the end of the step. As the height of the sphere increases, hydraulic pressure in the central chamber increases, thereby exerting pressure on the satellite chambers. Increased pressure on the satellite chambers causes one of the satellite piston shafts to extend outward into the laterally facing recess of the downwardly moving actuating rod being used to press downwardly on a selected one of the upper legs to rotate the sphere. The length by which the satellite piston shaft extends due to the increased pressure in the satellite chamber conforms to the lateral depth of the recess in the actuating rod as the latter moves downward past the satellite chamber through a step. With continued downward movement of the actuating rod, such that a midpoint of the recess travels past the extended satellite piston shaft, the depth of the recess begins to decrease, which presses the satellite piston shaft back into the satellite chamber, thereby increasing pressure in the satellite chamber. Increased pressure in the satellite chamber communicates a like pressure increase to the central chamber, thereby pressing downward on the central piston shaft to maintain contact with the sphere as its height decreases during the second half of the step. At the completion of a step, the hydraulic pressure in the central chamber is reduced to its beginning level, such that the satellite piston shafts are all retracted to their beginning positions. The actuating rod is thereby free to be retracted from its fully extended downward position upwards to its beginning position without interfering encroachment from the satellite piston shaft. The hydraulic system thereby maintains sliding contact between the central piston shaft and center sphere by coordinating the pressure variation in the hydraulic chambers with the downward movement of the actuating rod and the depth of the laterally facing recess as it travels past the satellite chamber.

In one embodiment, the downward force to move the actuating rods is supplied by hydraulics and compressed springs return the actuating rods upward to a home position.

A sequential stepped movement device, according to the invention, is capable of moving a work surface in a series of steps for accurate positioning, is simple to manufacture, and is capable of functioning in cold, arid, and wet conditions.

BRIEF DESCRIPTION OF THE DRAWINGS

FIGS. 7A-7D are a series of sectional views of the embodiment of the invention similar to that shown in FIG. 6B showing the elements of the invention during various stages of movement through a step.

FIGS. 9A-9C are perspective views of the sphere and legs of FIG. 8 showing the beginning, middle, and end positions thereof during a movement step.

FIG. 12 is a sectional view taken along lines 12-12 of FIG. 14A of an alternate embodiment of a sequential stepped movement device similar to that shown in FIG. 6B showing the hydraulic feedback elements of the invention.

DETAILED DESCRIPTION OF THE ILLUSTRATED EMBODIMENTS

Figure 1A:
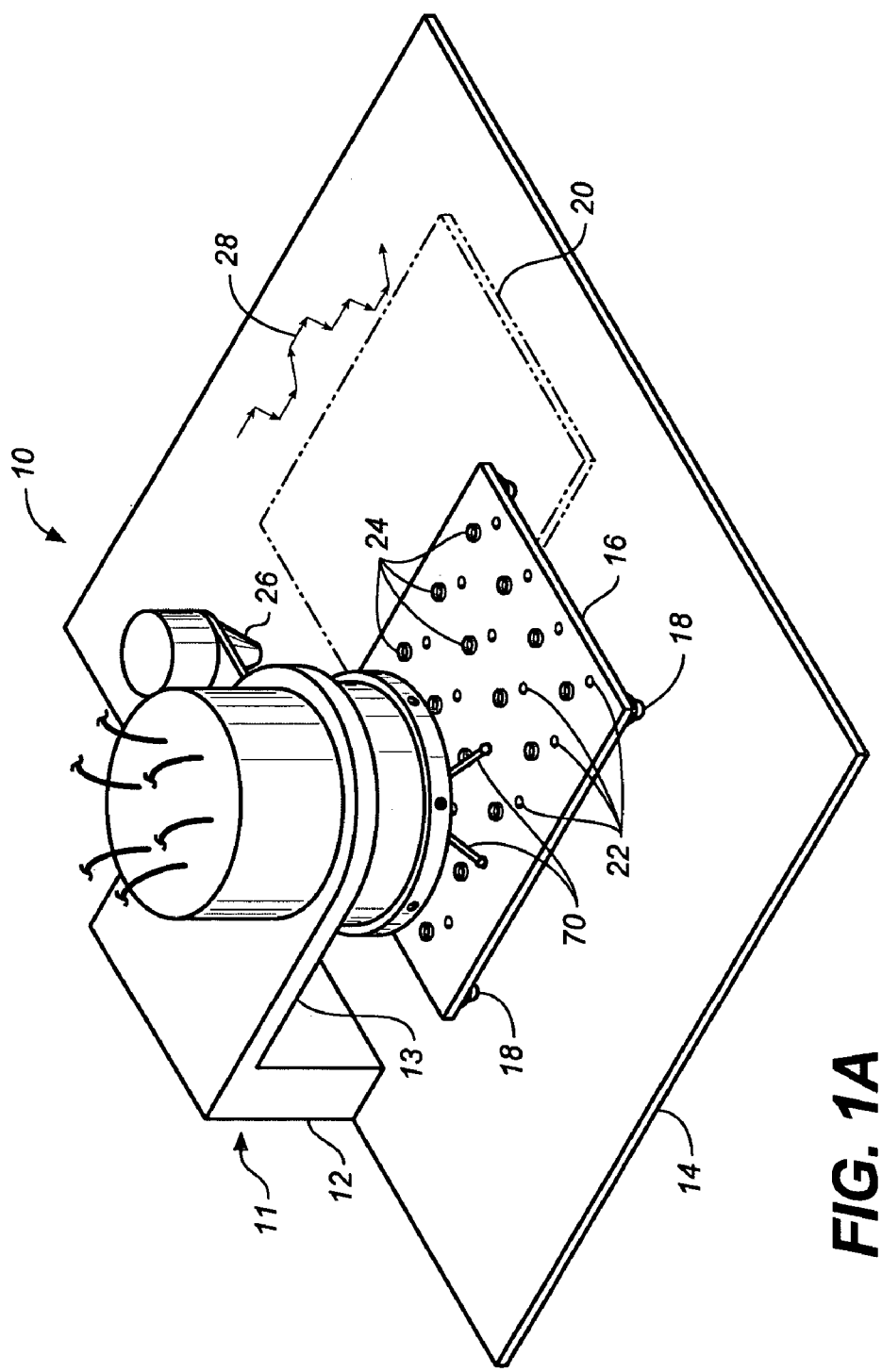
FIG. 1A is a perspective view of a sequential stepped movement device according to the invention.

A sequential stepped movement device according to the invention is now described with reference to the accompanying illustrations. The device is generally indicated at 10 in FIG. 1A and comprises a holder, indicated generally at 11, a support surface 14, and a work surface 16. The holder 11 comprises a vertical base member 12, and a horizontal support arm 13. The work surface 16 is capable of sliding movement over the support surface 14 by means of rollers or wheels 18 commonly familiar to those of skill in the art. A representative alternate position 20 of the work surface is indicated by the dotted lines. A second alternate position 20' of the work surface is indicated by the dotted lines in FIG. 2A. The work surface 16 is provided with at least one array of dimples 22, each having a concave surface (see FIG. 6A) and optionally with at least one array of work sites 24 fully interleaved with the array of dimples. A representative work arm 26 is provided for performing operations on the work sites 24. Path 28 indicates a representative one of many paths through which the work surface 16 may be moved by operation of the invention.

Figure 1B:
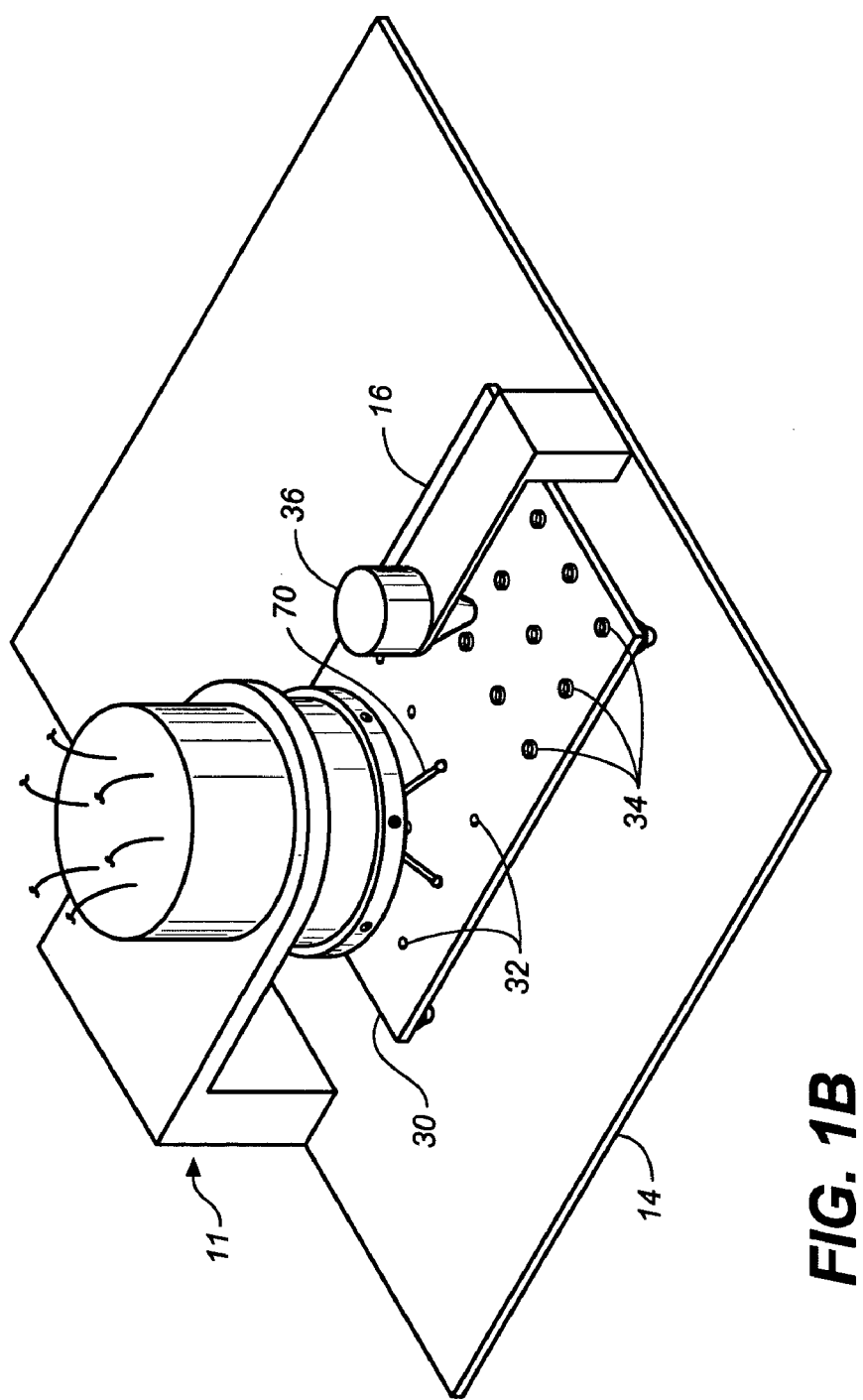
FIG. 1B is a perspective view of another embodiment of the sequential stepped movement mechanism shown in FIG. 1A with a different work surface and reference indicator.
Figure 2A:
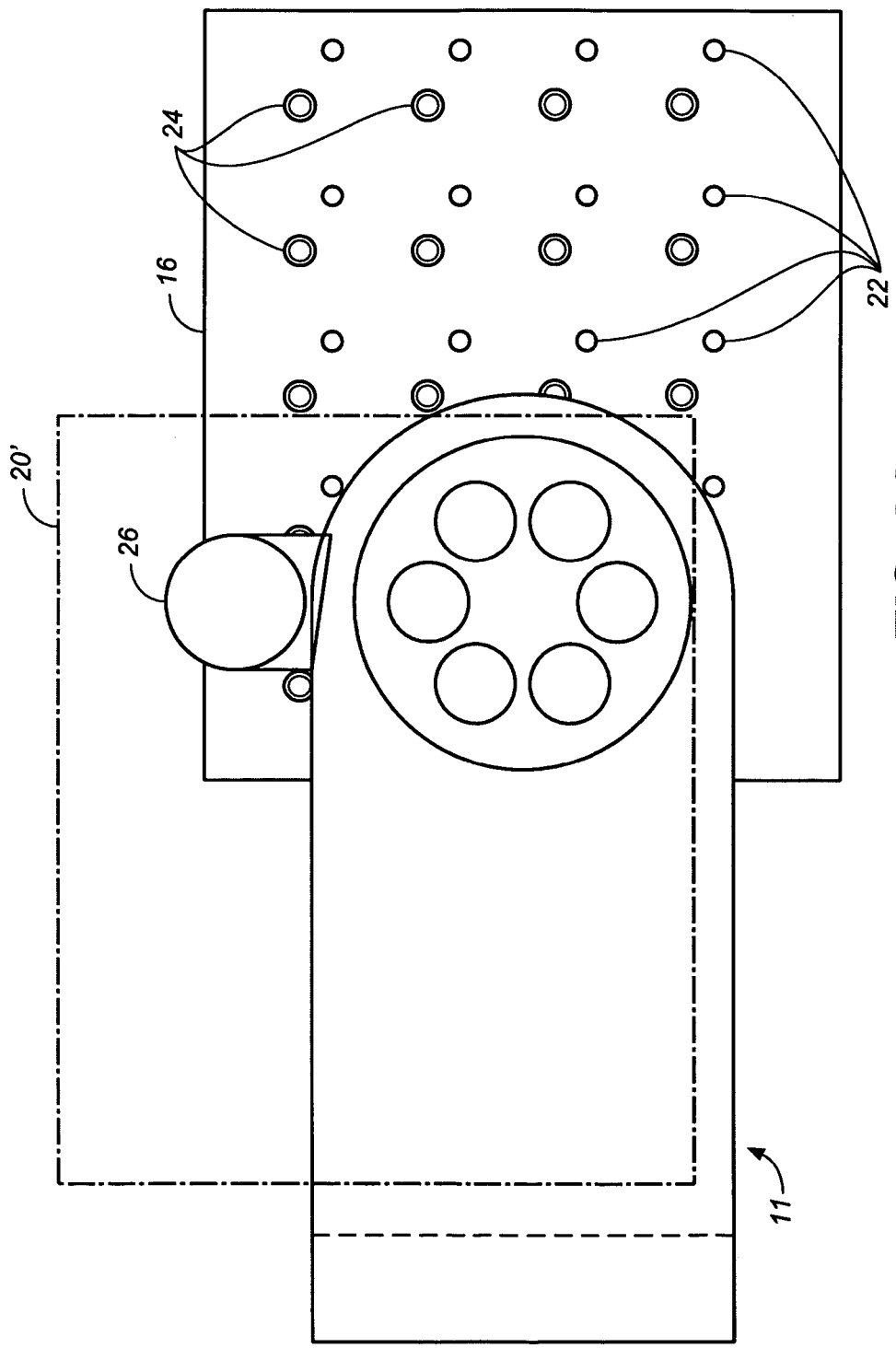
FIG. 2A is a plan view of the sequential stepped movement device of FIG. 1A showing another position of the work surface in phantom lines.
Figure 2B:
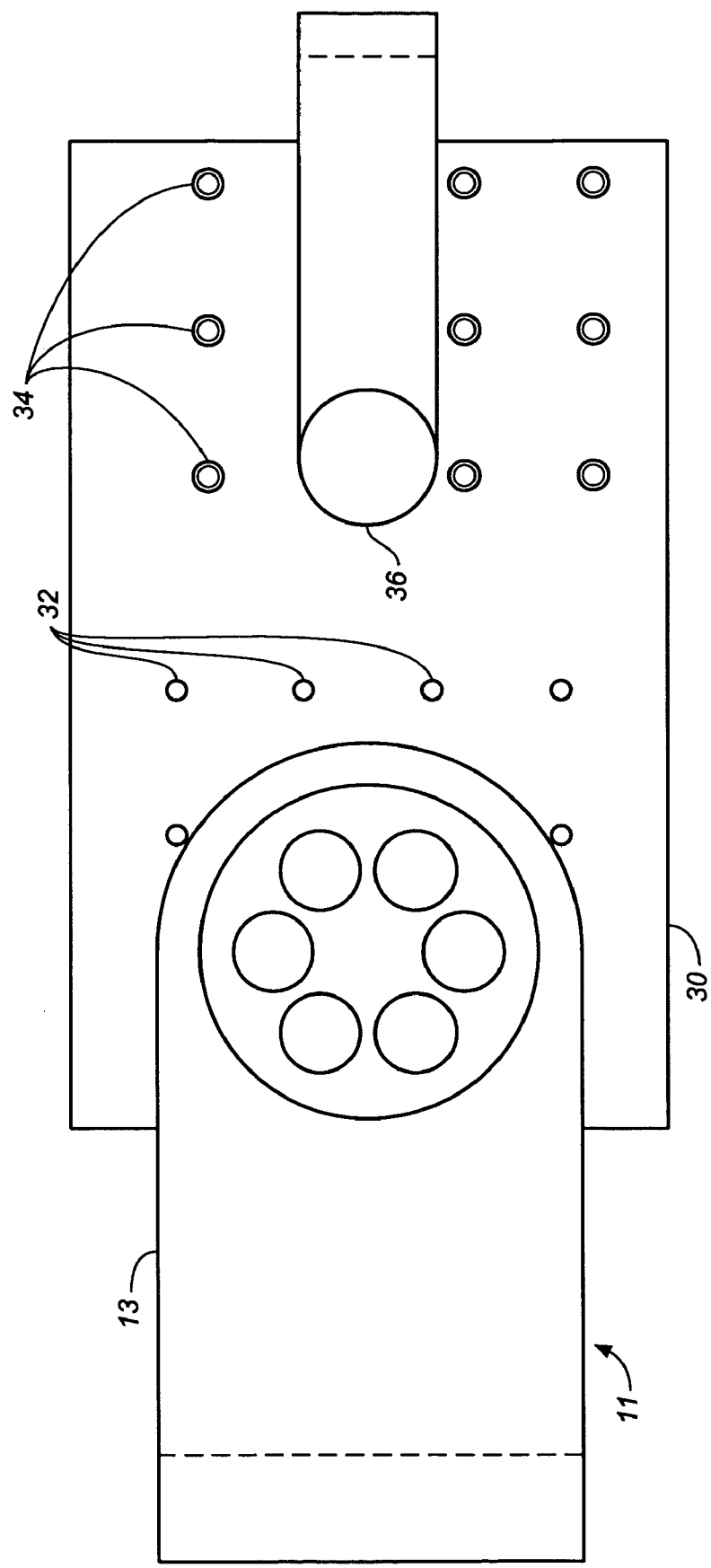
FIG. 2B is a plan view of the sequential step movement device shown in FIG. 1B.

An alternate embodiment of the invention is seen in FIGS. 1B and 2B in which an alternate work surface 30, similar to work surface 16 in FIG. 1A, is provided with at least one alternate array of dimples 32, but wherein at least one alternate array of work sites 34 is arranged on the work surface geographically separated from the array of dimples. Consistently therewith an alternate work arm 36 is provided to perform operations on the work sites 34.

Figure 3A:
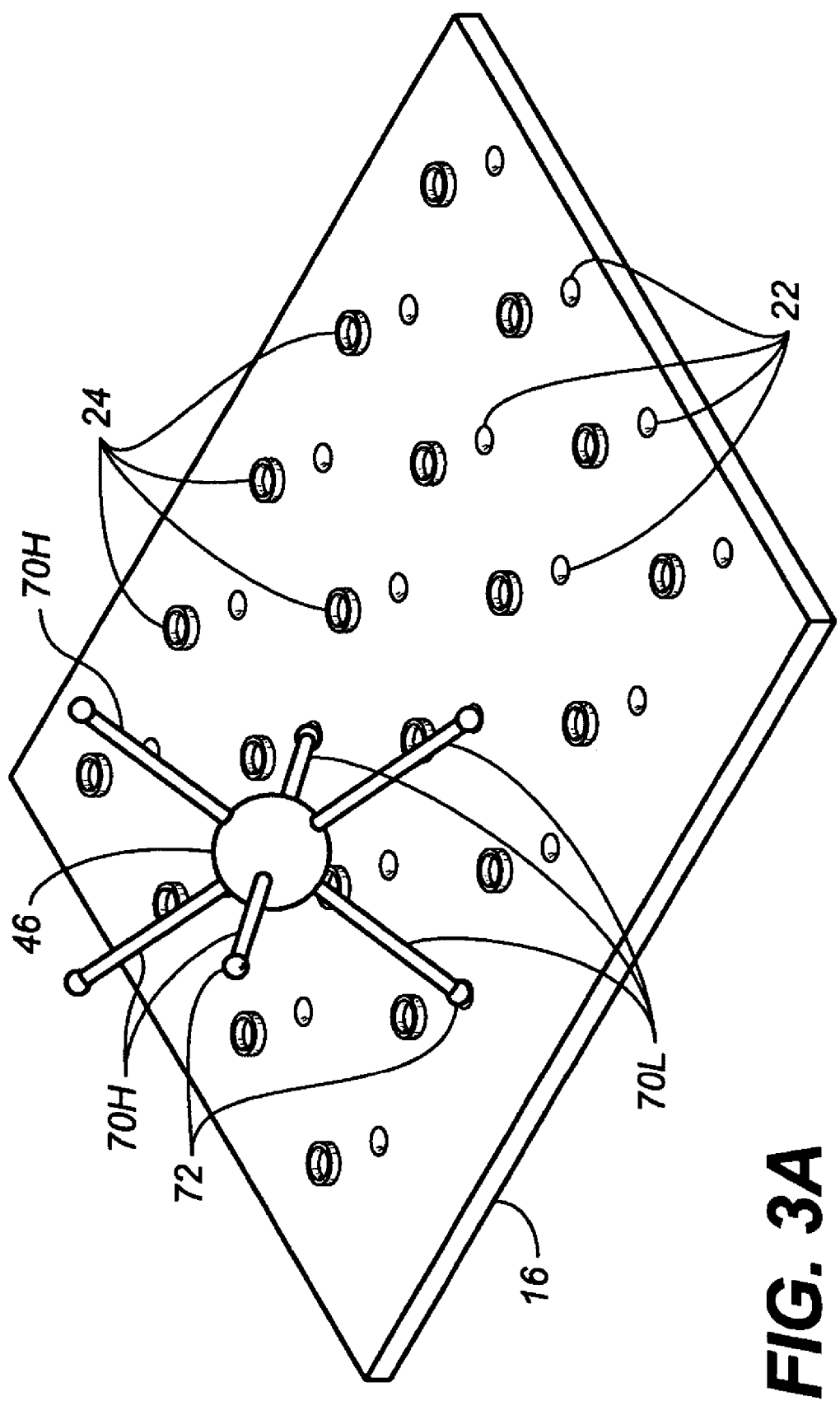
FIG. 3A is a perspective view of a representative work surface of the type shown in FIG. 1B having an array of dimples in which is indexed three of the legs of a center sphere.
Figure 4A:
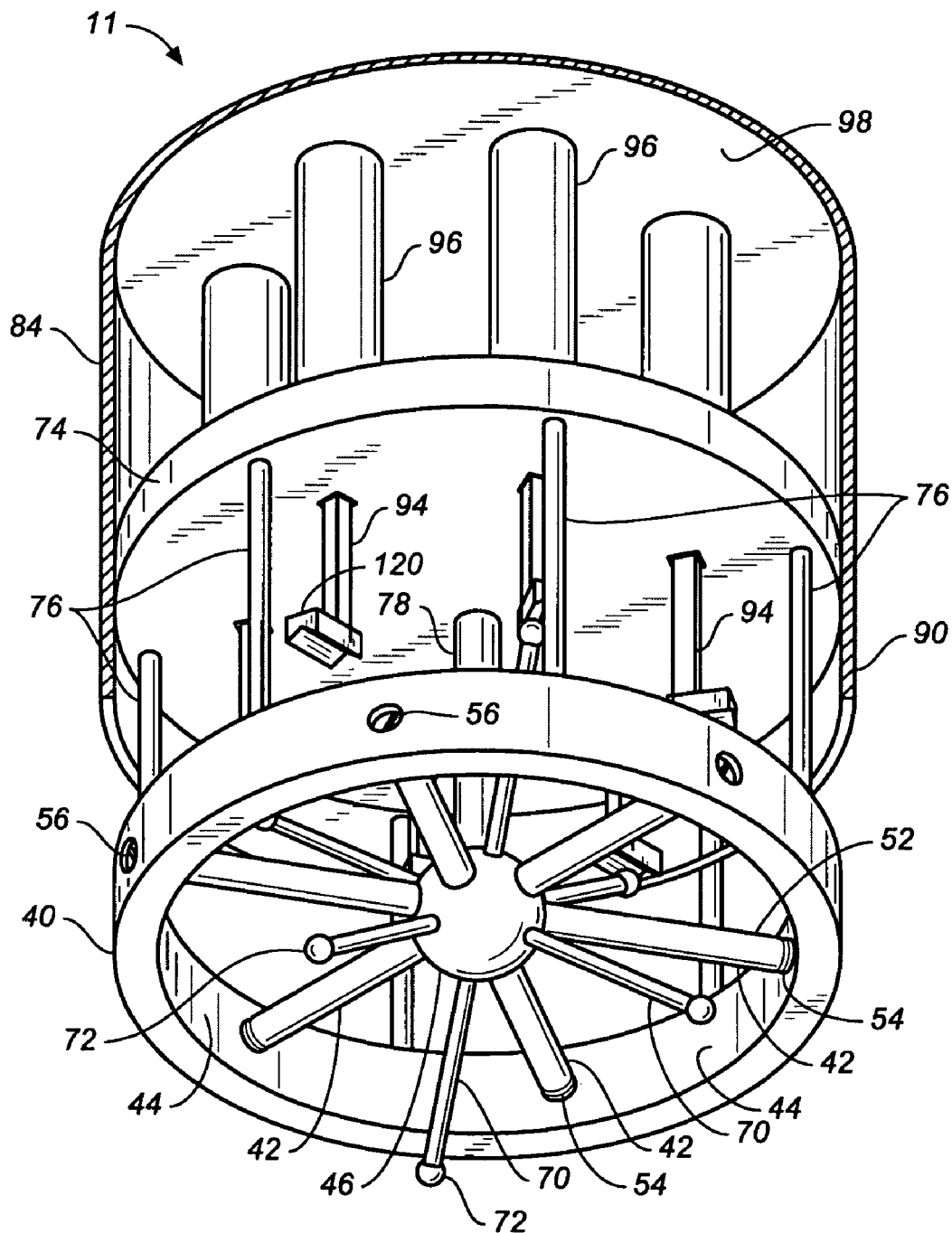
FIG. 4A is a lower perspective view of the core elements of a sequential step movement device with portions of the guide cylinder broken away and the guide plate removed.
Figure 10:
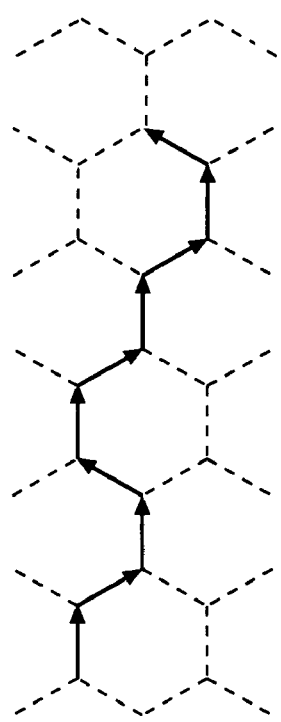
FIG. 10 is a schematic representation of the available directions for movement of a work surface by the invention through the first and second steps of movement.
Figure 11:
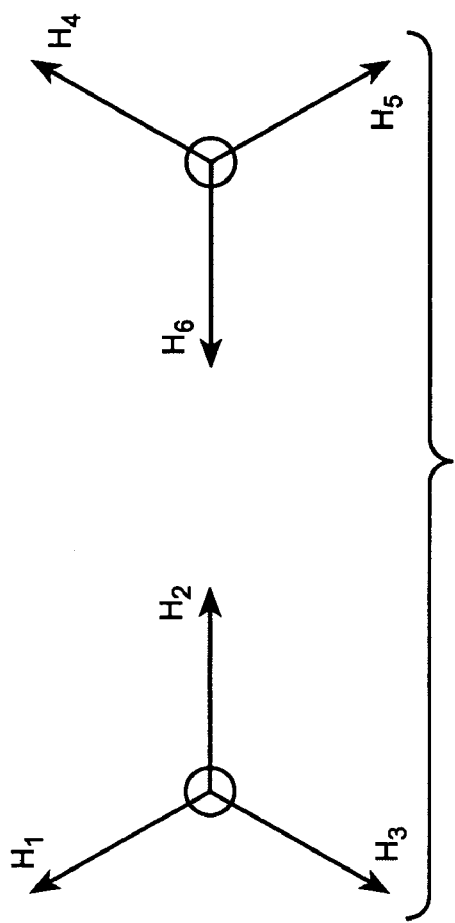
FIG. 11 is a schematic diagram of a possible path of movement of a work surface over a support surface according to the invention.
Figure 8:
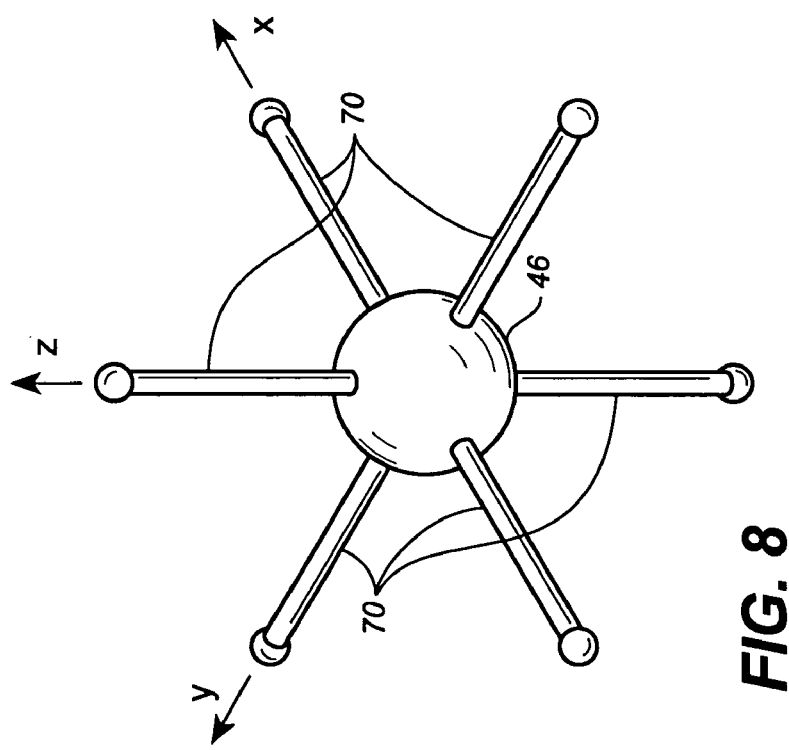
FIG. 8 is a perspective view of a sphere and legs of a sequential stepped movement device according to the invention.

With additional reference to FIGS. 3A and 4A, in the most functionally simple terms, the invention moves the work surface 16 over the support surface 14 by rotation of a set of six legs 70 of equal length extending radially from a central sphere 46 which is held in a fixed horizontal position with respect to the support surface 14. Referring now to FIG. 8, the six legs 70 are organized orthogonally in an X-Y-Z axial configuration, wherein each axis is formed from a pair of axially aligned legs extending from opposite sides of the sphere 46, the distal end 72 of each leg having a ball-shaped terminus having a convex outer surface. The legs 70 and sphere 46, when placed on a horizontal surface, assume a natural rest position (see FIGS. 3A and 9A) in which three "low" legs 70L rest in dimples 22 on the work surface 16, and the three "high" legs 70H, obverse twins of the three "low" legs 70L, extend upward from the sphere 46. As seen in FIG. 10, from the rest position, the legs 70 and sphere 46 as a unit can be moved in any of three directions, $H_1$, $H_2$, and $H_3$, represented by the inverse of the horizontal direction of extension of each one of the high legs 70H. Referring back to FIG. 9A, in any selected one of the three available directions of movement $H_1$, $H_2$, and $H_3$, movement is accomplished by applying sufficient downward force to a selected one of the high legs 70H to rotate the sphere 46 in the direction indicated by arrow H until the distal end 72 of the high leg 70H rests on the work surface 16. Rotation of the sphere 46 simultaneously causes the two low legs 70L, initially disposed directly below the selected high leg 70H, to "walk" underneath the sphere 46. See FIGS. 9A, 9B and 9C. This movement represents a first step. At the end of the first step, the sphere 46 and legs 70 are in a new rest position wherein the selected high leg 70H is in the position of a "new" low leg, and a "new" set of three high legs are established. See FIG. 9C. The device may then be moved through a second step in one of three directions $H_4$, $H_5$, and $H_6$, represented by the inverse of the horizontal direction of three "new" high legs. See FIG. 10. Movement through the second step is identical to movement of the device through the first step, except that the three directions of movement available for the second step ($H_4$, $H_5$, and $H_6$) are offset sixty degrees from the three directions of movement available at commencement of the first step ($H_1$, $H_2$, and $H_3$). Subsequent steps after the second step are in like fashion available; the directions of movement for any step offset by sixty degrees from the available directions of movement at the beginning of the previous step. An illustrative path of movement is graphically illustrated in FIG. 11.

There are a great number of methods by which sufficient force may be applied to the legs 70 of the sphere 46 to accomplish the desired movement, in addition to the specific embodiment described below. Downward force may be applied on the high leg, or upward force on the low leg which is the rearward counterpart of the high leg; force can be applied simultaneously to the forward high leg, and to the two rearward high legs to produce a forward-sweeping motion consistent with the forward motion of the high leg; or, force can be applied to all high legs as just described and to one low leg. Innumerable combinations of application of force are possible. For example, downward force on a high leg can be generated by weights. Rods used to push or pull the high leg may be actuated by electrical, hydraulic, pneumatic, or jackscrew means. Similarly, upward force on a "low" leg, e.g., the rear low legs, may be generated by extending those legs, by extending a tip of those legs, or by pulling upward. Sideways force can be generated on "high" legs, preferably the two rear high legs, using similar methods.

The force necessary for such motion may be created in many ways, including by application of downward force on a high leg by weights, pulleys, or push-rods. Push-rods may be activated by electric, hydraulic, or pneumatic means. Alternatively, a jack screw may be used to supply the appropriate downward force. Similarly, upward force on a low leg may be generated by any of the above means for application of force on a high leg, and by extending the low leg or expanding or extending a tip of the low leg. Sideways force on high legs can be generated by push-rods or pull-rods, gear or ratchet mechanisms, or high-pressure gas jets. Alternatively, a torque may be developed internally in the sphere, as by a rotating fly wheel which, when braked, supplies the needed torque in the proper direction.

Figure 4B:
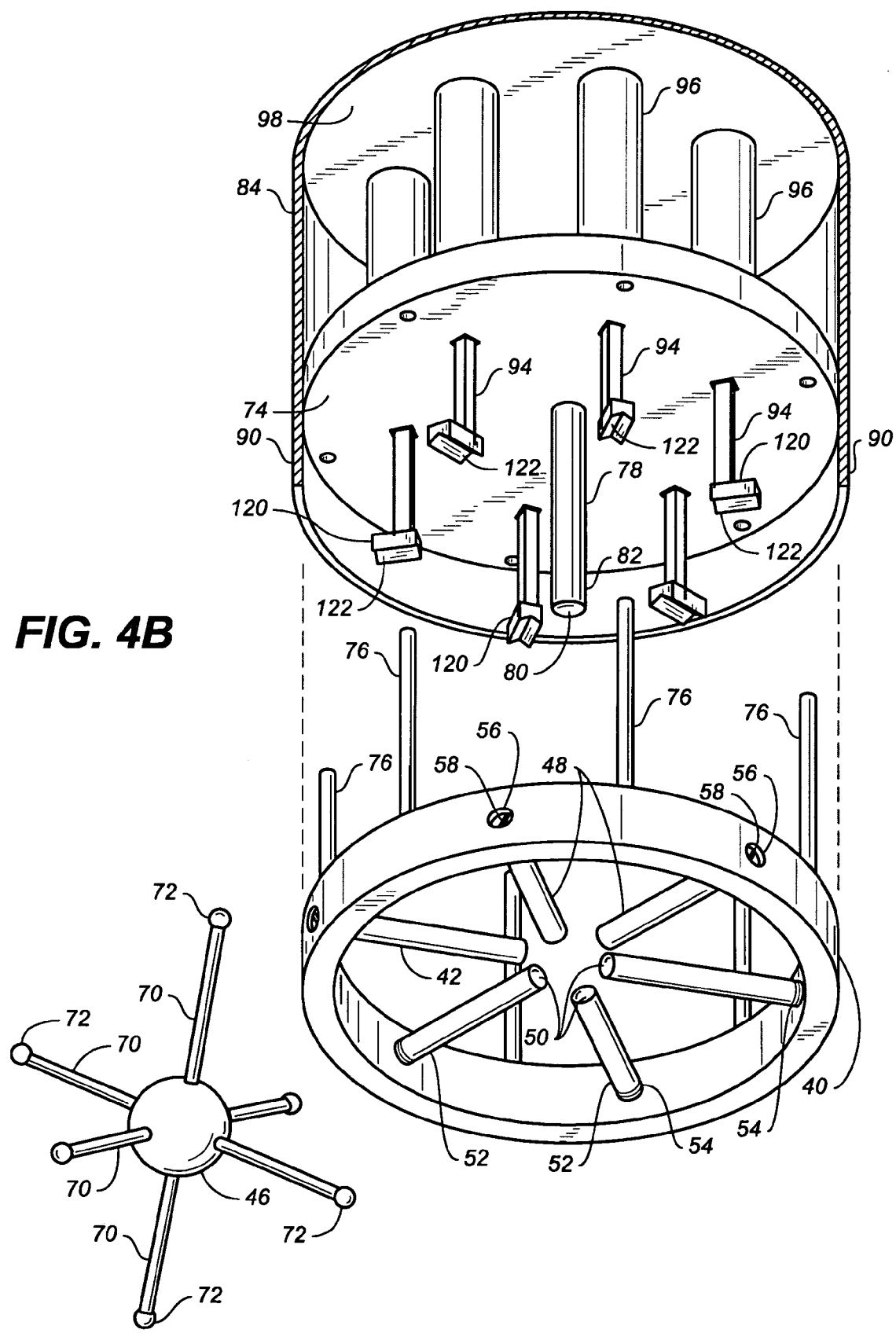
FIG. 4B is an exploded lower perspective view of the elements of the sequential step movement device shown in FIG. 4A.

With reference to FIGS. 4A and 4B, the holder 11 comprises in part a primary retaining member 40 having preferably an annular shape. In the illustrated embodiment six arms 42 extend inwardly from the inner surface 44 of the primary retaining member 40 to hold mutually between them a sphere 46. The invention is not limited to a primary retaining member having only an annular shape and is intended to encompass a primary retaining member of any shape which will support the inwardly extending arms 42. For example, the inner surface or the outer surface of the primary retaining member could have a hexagonal shape. In the preferred embodiment, each arm 42 has an inner end 48 having a concave surface 50 conforming to the convex outer surface of the sphere 46, and the outer end 52 of each arm 42 has threads 54 for engagement with threaded holes 56 in the primary retaining member 40. Slots 58 in the outer ends 52 of the arms 42 allow for adjustments to the inward extent of the arms 42 with a screwdriver in order to hold the sphere 46 between the arms 42 while allowing it to rotate.

A secondary retaining member 74 is rigidly secured in superposition to the primary retaining member 40 with a plurality of guide rods 76. In the illustrated embodiment the guide rods 76 are arranged in parallel disposition around the periphery of the primary and secondary retaining members 40, 74. Depending from the center of the secondary retaining member 74, a center bearing member 78 extends downwardly to the top of the sphere 46. A downward-facing lower surface 80 on the lower end 82 of the center bearing member 78 has a concave curvature conforming to the convex outer surface of the sphere 46. The lower surface 80 rests on the top of and in sliding engagement with the sphere 46 as perhaps best seen with additional reference to FIG. 6A.

Figure 5A:
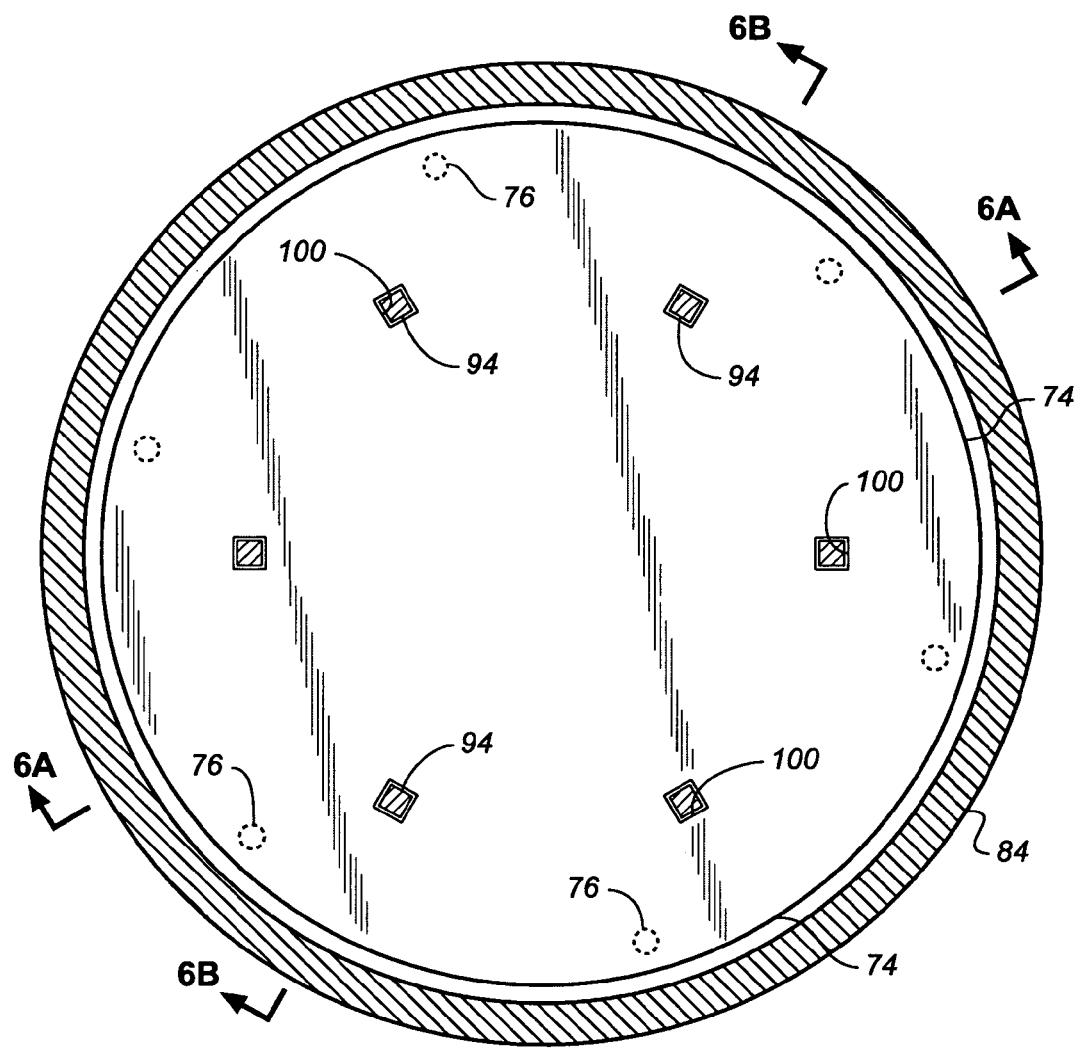
FIG. 5A is a sectional view taken along lines 5A-5A of the embodiment of the invention shown in FIGS. 6A and 6B.
Figure 5B:
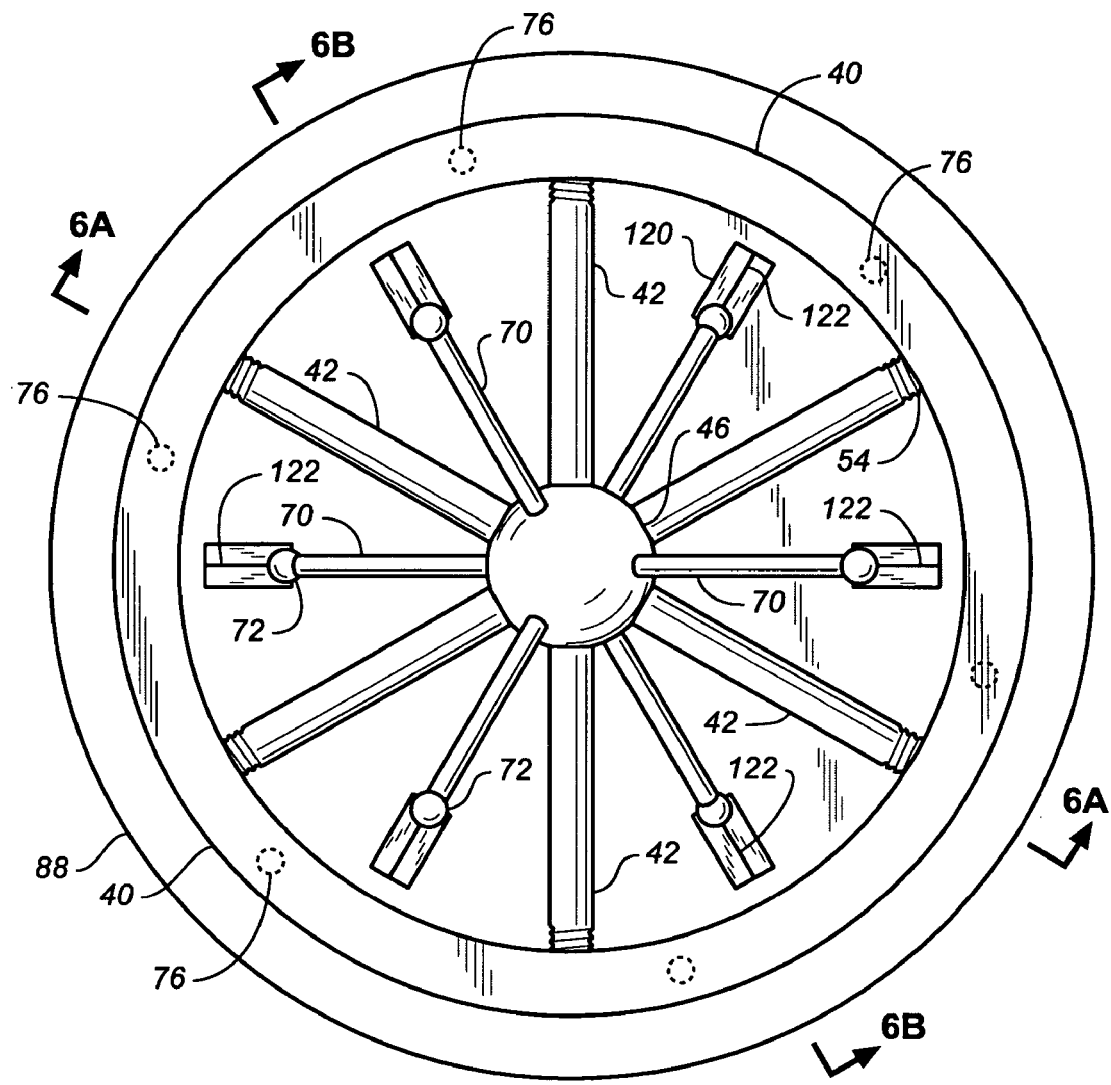
FIG. 5B is a sectional view taken along lines 5B-5B of the embodiment of the invention shown in FIGS. 6A and 6B.
Figure 5C:
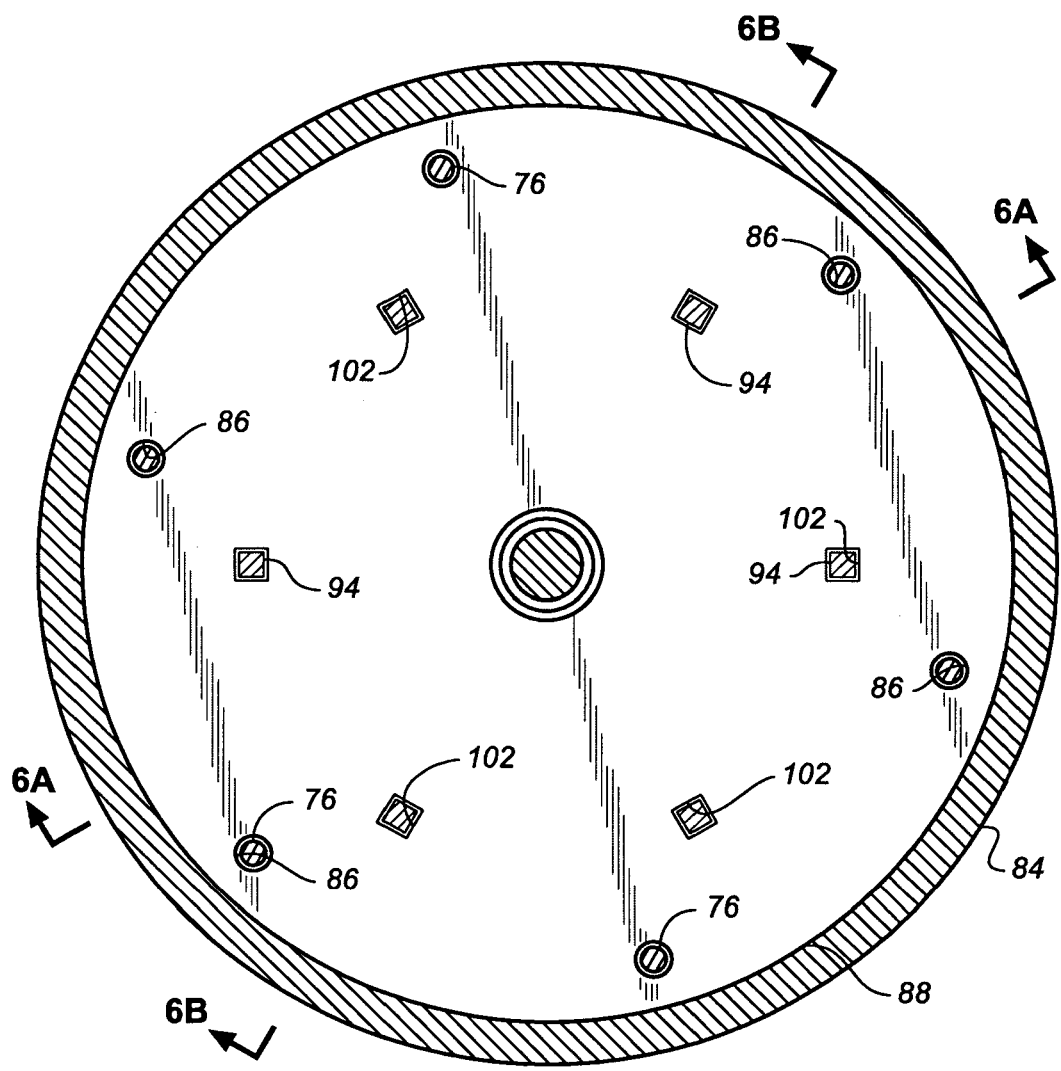
FIG. 5C is a sectional view taken along lines 5C-5C of the embodiment of the invention shown in FIGS. 6A and 6B.
Figure 6A:
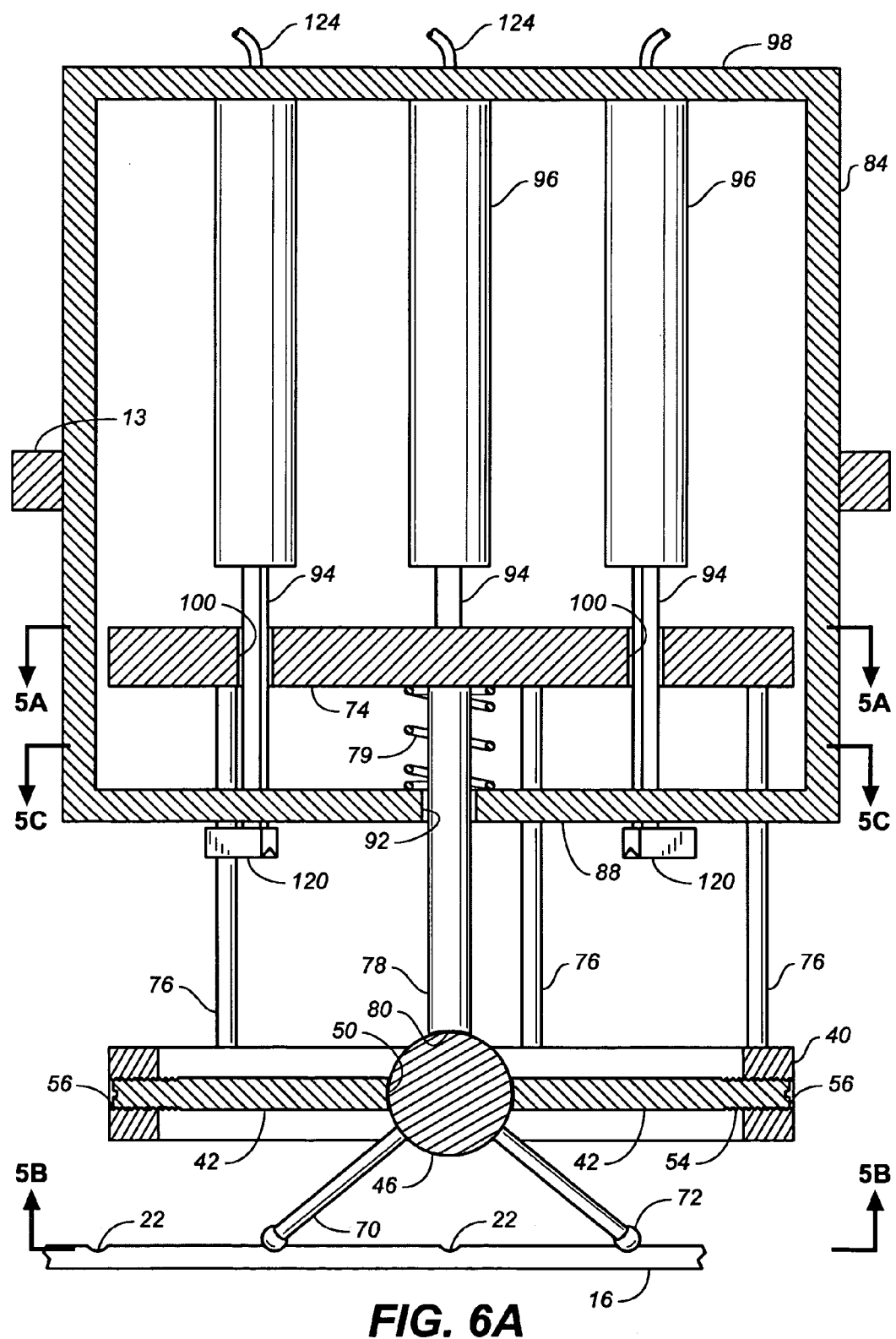
FIG. 6A is a sectional view taken along lines 6A-6A of FIGS. 5A, 5B, and 5C of a sequential stepped movement device according to the invention.

With continuing reference to FIGS. 4A and 6A, the secondary retaining member 74 is disposed inside an alignment cylinder 84 such that it is freely slidable vertically but retained against horizontal movement. The guide rods 76 are retained slidably in a plurality of bores 86 (as best seen in FIG. 5C) in a guide plate 88 which extends between the lower edges 90 of the alignment cylinder 84. The center bearing member 78 extends through a center hole 92 in the guide plate. A compression spring 79 coiled around center bearing member 78 transfers some of the weight of the primary and secondary retaining members 40, 74, and the connecting guide rods 76, to the alignment cylinder 84 in order to relieve pressure bearing on the sphere 46 from above by the center bearing member 78 and laterally from arms 42.

Figure 6B:
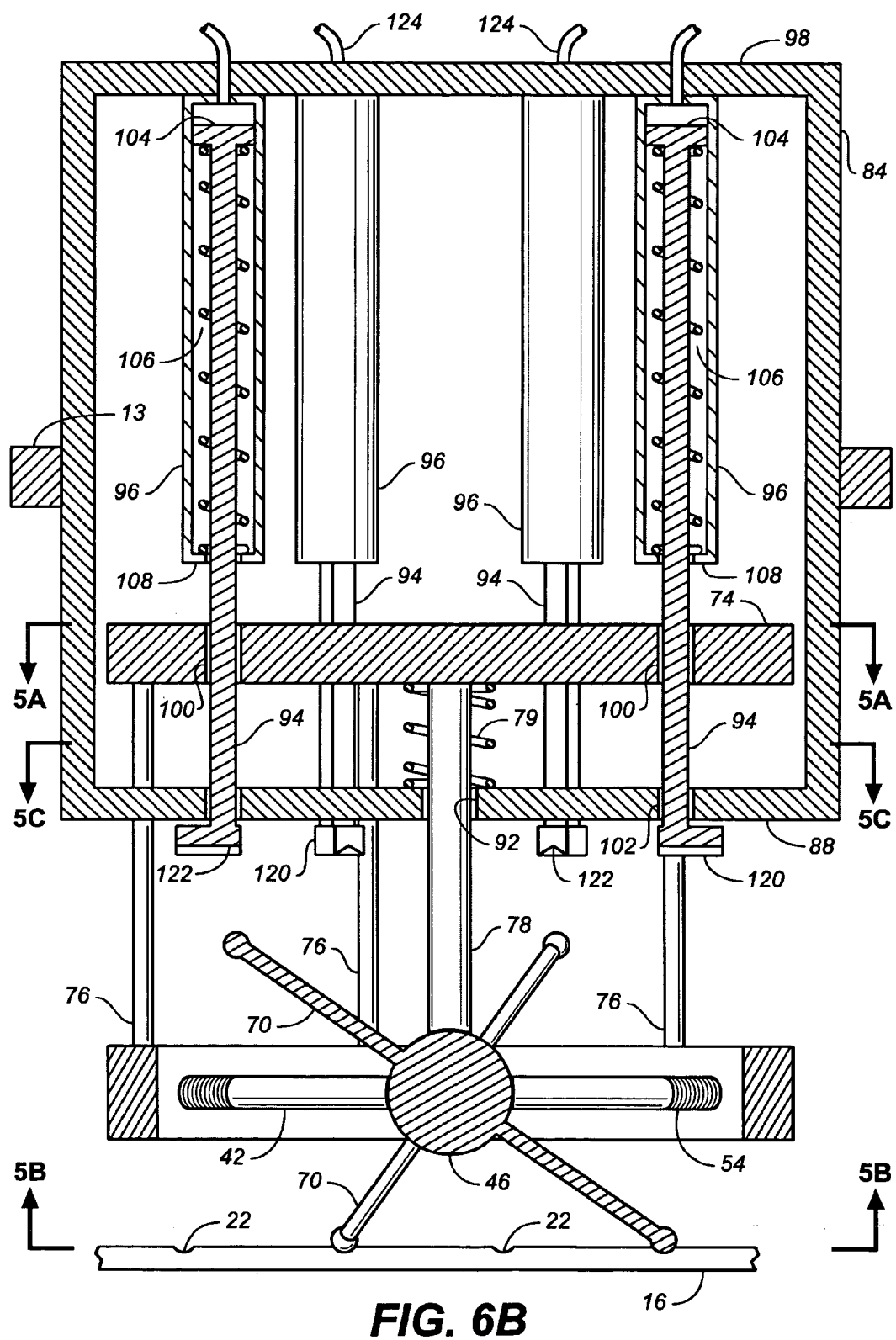
FIG. 6B is a sectional view taken along lines 6B-6B of FIGS. 5A, 5B, and 5C of a sequential stepped movement device according to the invention.

A set of six actuating rods 94 depend from housings 96 which are affixed to the top 98 of the alignment cylinder 84. As shown in FIGS. 6A and 6B, the actuating rods 94 are in an uppermost rest position fully retracted in housings 96, each leg poised in superposition to one of the legs 70. Each actuating rod 94 has a rectilinear cross-section (as shown in FIGS. 5A and 5C), and passes through an aperture 100 in the secondary retaining member 74 and, as seen in FIG. 6B, a guide hole 102 in the guide plate 88 in parallel alignment with the aperture 100. Both the aperture 100 and guide hole 102 have rectilinear profiles dimensioned slightly larger than the cross-section of the actuating rod 94, such that the rods 94 are held against twisting along their longitudinal axes yet remain freely slidable longitudinally. In the embodiment illustrated in FIG. 6B, a piston 104 at the top of each actuating rod 94 is slidably retained within the housing 96. A spring 106 coiled around the actuating rod 94 is captured in compression between the piston 104 and the lower wall 108 of the housing 96 such that the actuating rod 94 encounters resistance as it is pushed downwards. A foot 120 at the bottom of each actuating rod 94 has a downwardly facing horizontal groove 122 which extends radially relative to the center of the device. The downwardly extended legs can be moved in any one of three directions inversely coincident with the horizontal orientation of the three upwardly extending legs by pushing down on a selected one of the latter. See FIGS. 5B and 7A.

Figure 7D:
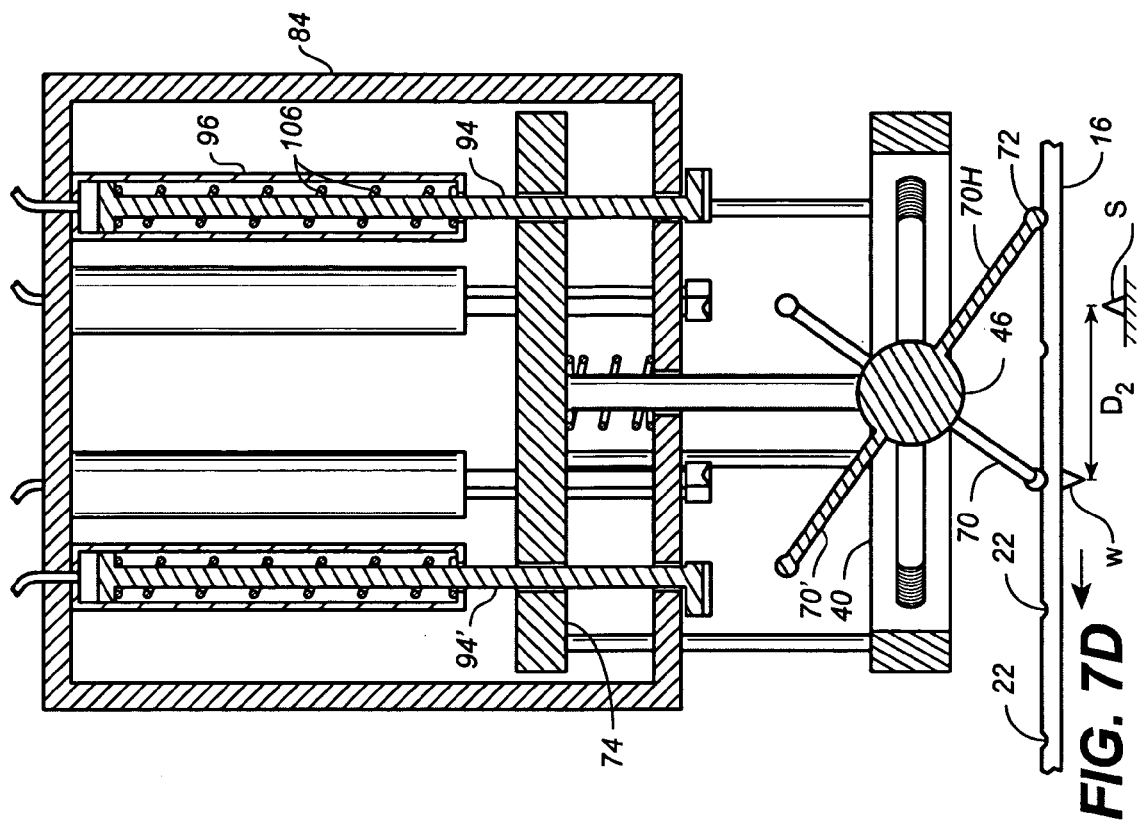
Figure 7C:
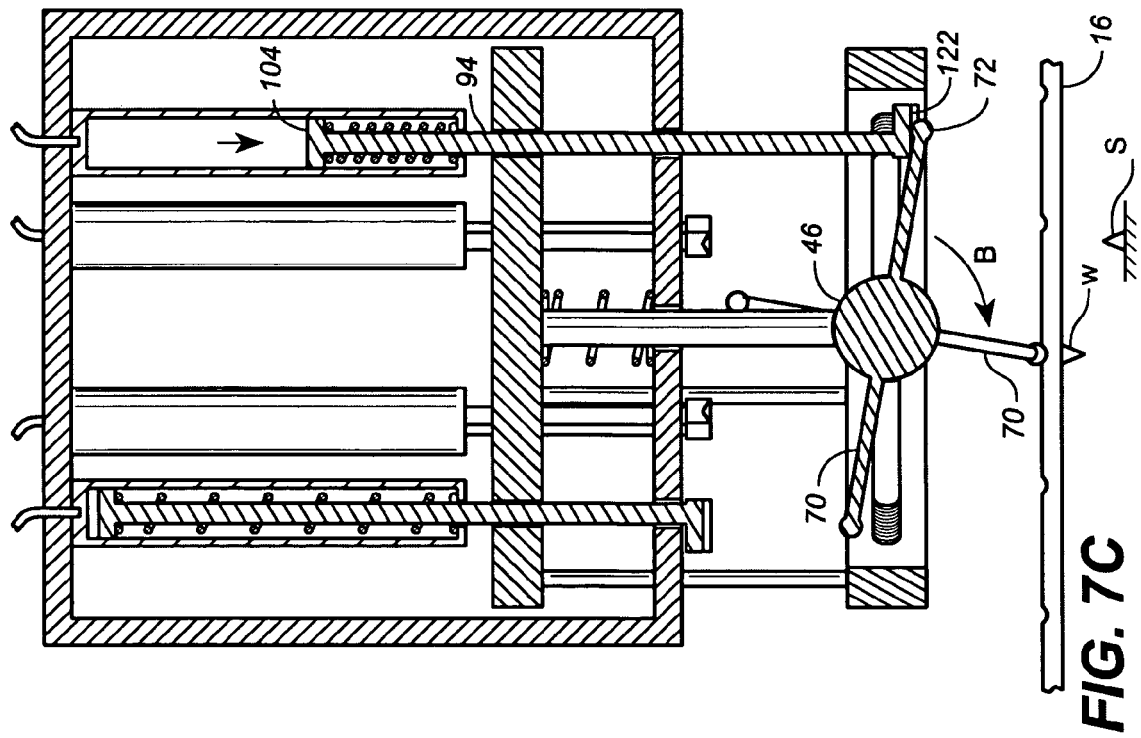

With reference to FIGS. 7A to 7C, it is seen that, one of the actuating rods 94 has moved downwards from the rest position to a beginning contact position where foot 120 initially engages the distal end 72 of leg 70H. From the beginning contact position, as the actuating rod 94 begins to move the distal end 72 of leg 70H downward, the groove 122 retains the distal end 72 in a vertical plane common with the groove 122 (see FIGS. 7B and 7C). In FIG. 7A, foot 120 of the actuating rod 94 is in contact with the distal end 72 of one of the high legs 70H, however the leg 70 has not started moving through a step. Accordingly, the position of the work surface 16 as indicated by work surface reference point W has not changed relative to the support surface 14 indicated by support surface reference point S. In FIG. 7B, hydraulic pressure supplied by hydraulic lines 124 provide hydraulic fluid to the top of housing 96 causing piston 104 to move downward in the direction of arrow A, thereby causing actuating rod 94 and foot 120 to push down on distal end 72. This causes legs 70 and sphere 46 to rotate in the direction of arrow B causing, in turn, lower legs 70L to "walk" underneath sphere 46 thereby moving working surface 16 in the direction of arrow C a distance represented by the horizontal separation of reference points W and S. As the high leg 70H is rotated by the actuating rod 94, the distal end 72 moves downward and outward, the outward movement causing it to slide along the surface of the groove 122 of the foot 120. The distal end 72 is thus effectively retained in a vertical plane even as it slides horizontally in the groove 122. In FIG. 7B the sphere 46 and legs 70 have achieved a rotational attitude that is approaching the halfway point of a step. Accordingly, the distal end 72 has slid almost to the furthest extent along groove 122. In FIG. 7C, the sphere 46 and legs 70 have rotated just beyond the halfway point such that the distal end has just begun horizontally sliding back along the groove 122. When the actuating rod 94 has pushed the high leg 70H fully downward to the position seen in FIG. 7D, the distal end 72 will have slid back to the position along the groove 122 in which it started at the beginning of the step shown in FIG. 7A.

Referring again to FIG. 7B, the movement of lower legs 70L under sphere 46 necessarily causes the height of sphere 46 to increase relative to its height at the beginning of the step, as seen in FIG. 7A, a distance $D_1$ resulting in the height of the primary and secondary retaining members 40, 74 also increasing by distance $D_1$. Primary and secondary retaining members 40, 74 are prevented from rotating by the combined stabilizing effect of the close tolerance between the outer surface 126 of the secondary retaining member 74 and the inner surface 128 of the alignment cylinder 84 working in tandem with the close retention of the guide rods 76 in the bores 86 (see FIG. 5C) of the guide plate 88 and the further retention of the actuating rods 94 in the apertures 100 of the secondary retaining member 74 and in the guide holes 102 of the guide plate 88. As the height of the secondary retaining member 74 increases the space between it and the guide plate 88 increases by a like distance, i.e., $D_1$ in FIG. 7B, and compression spring 79 expands.

In FIG. 7C it is seen that the actuating rod 94 has continued its downward progression such that the sphere 46 and legs 70 have rotated further along the direction indicated by arrow B. As a result work surface 16 has moved a further distance indicated by the horizontal separation of reference points W and S. In FIG. 7D the sphere 46 and legs 70 have rotated fully through the step such that the distal end 72 of high leg 70H is indexed in one of the dimples 22 of the work surface 16 and the work surface 16 has moved a distance $D_2$ relative to its starting position at the beginning of the step shown in FIG. 7A. Once the high leg 70H has been pushed fully downward, such that the device has moved through a step, the hydraulic pressure in housing 96 is relieved permitting the spring 106 to return the actuating rod 94 to its rest position shown in FIGS. 6A and 6B. At the end of the step, it is seen that actuating rod 94', seen on the left of FIG. 7D, is in superposition to leg 70'. Similarly two other actuating rods are in position above the two other upwardly extending legs such that a subsequent step may be executed by downward movement of a selected one of those three actuating rods on one of the three upwardly extending legs.

Figure 3B:
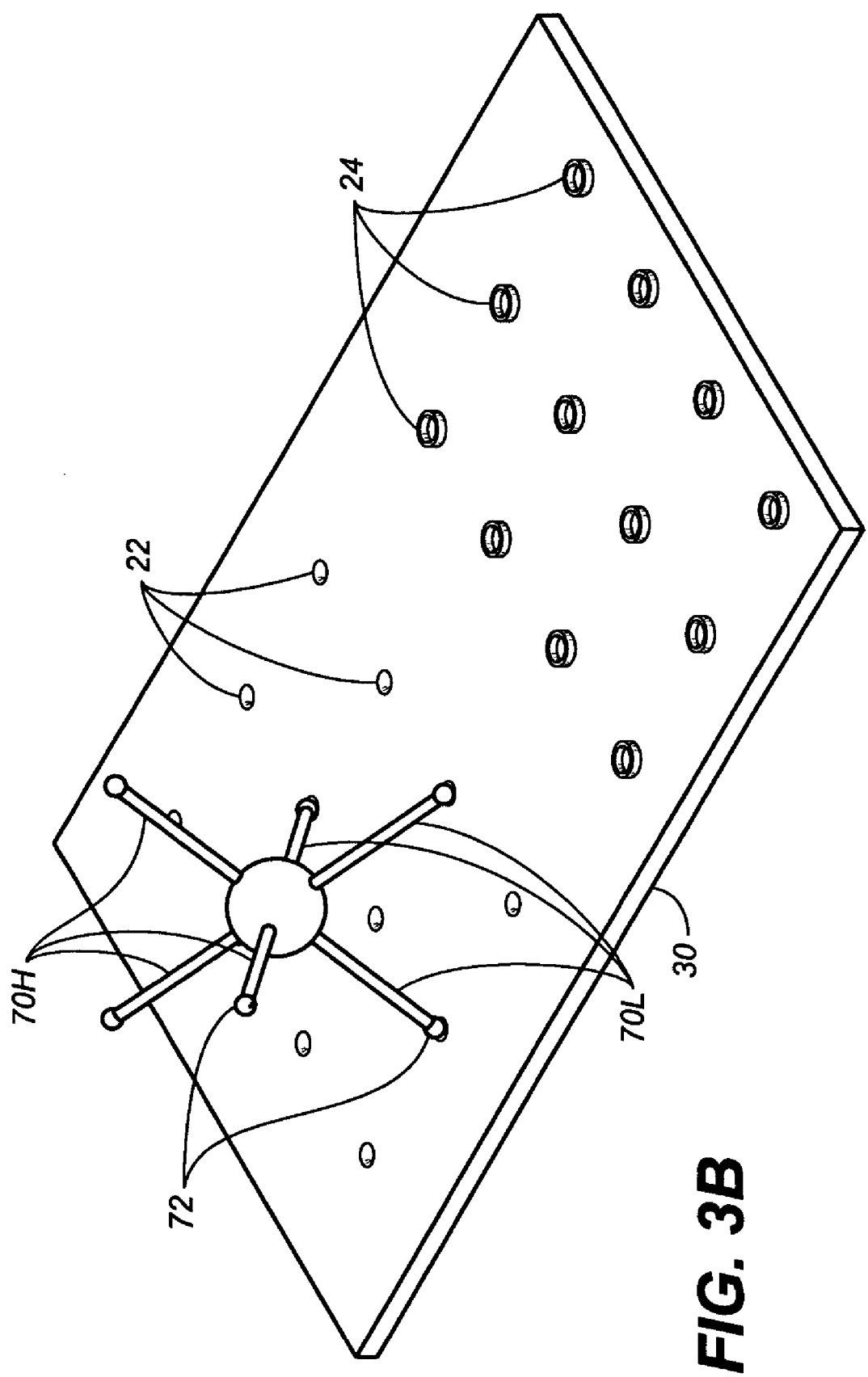
FIG. 3B is a perspective view of a representative work surface of the type shown in FIG. 1B having an array of dimples in which are indexed three of the legs of a center sphere.

With reference now to FIG. 3A, the work surface 16 shown in FIGS. 1A and 2A is seen in isolation with the sphere 46 and legs 70. The work surface 16 illustrated in FIG. 3A includes one array of dimples 22 and one array of work sites 24 interleaved with the array of dimples. By rotating the sphere 46 as discussed above, the work surface 16 may be moved horizontally one step a distance $D_2$ (see FIG. 7D) in a selected direction according to which high leg 70H is rotated. In each position to which the work surface 16 is moved, a work task may be performed on one of the work sites 24 by the work arm 26 or in concert with other related devices. FIG. 3B is similar to FIG. 3A and illustrates an alternative work surface shown in FIGS. 1B and 2B. In the embodiment illustrated in FIG. 3B, the array of dimples 22 is geographically separated from the array of work sites 24 such as might facilitate performing work operations on the work sites 24 by the alternative work arm 36 shown in FIG. 1B. The invention is not limited to a work surface with one array of dimples and is intended to embrace a work surface provided with a plurality of arrays of dimples such as may be desired to move an array of work sites to a slightly different set of positions according to the tools being employed to perform a desired work task. Similarly the invention is not limited to a work surface having only one array of work sites but is intended to cover a work surface having a plurality of arrays of work sites.

Figure 14A:
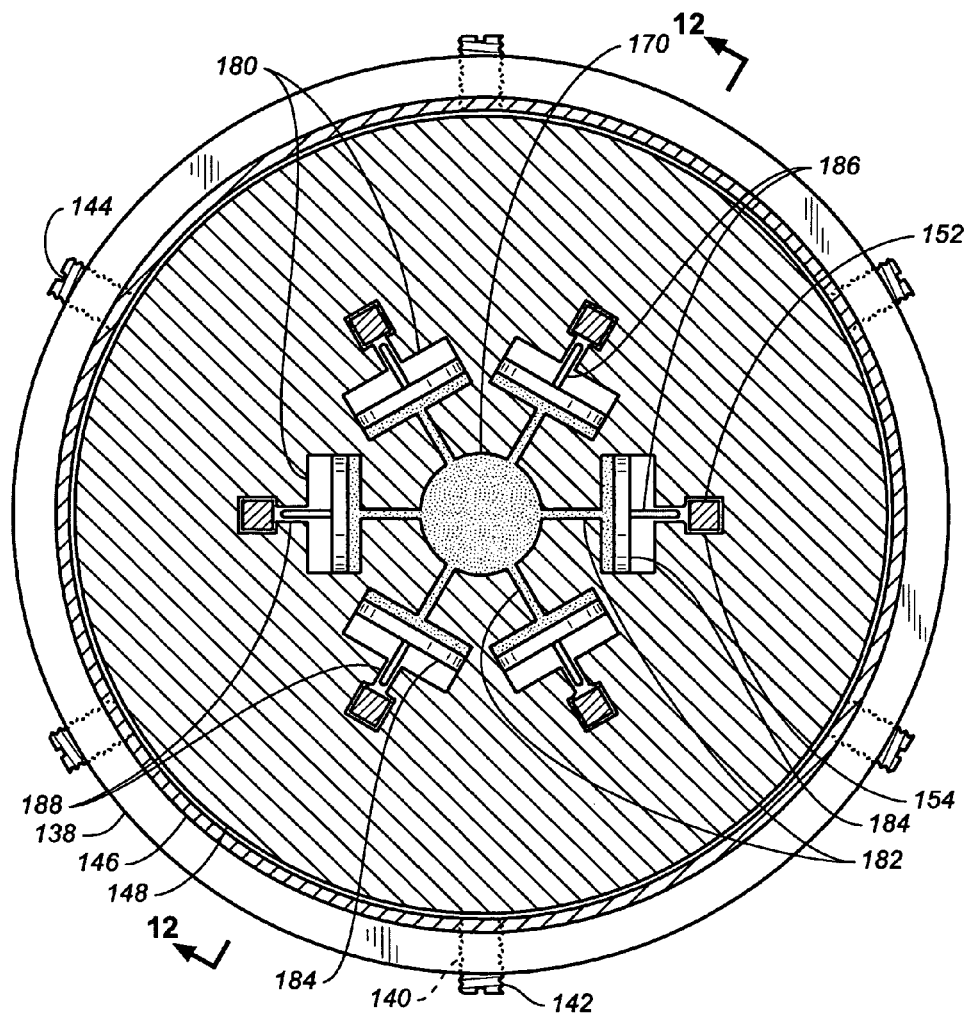
FIG. 14A is a sectional view taken along lines 14A-14A of FIG. 12 of the embodiment of the invention shown in FIG. 12.

An alternative embodiment of a sequential stepped movement staging device is shown in FIG. 12 comprising a sphere 130 and legs 132 retained by and between the concave-shaped inner ends 134 of six inwardly extending arms 136 similar to the embodiment shown in FIG. 6A. A primary retaining member 138 includes threaded holes 140 (seen in dotted line in FIGS. 14A and 14B) for engagement with the threaded outer ends 142 of the arms 136. A slot 144 in the outer end 142 of each arm 136 allows for adjustments to the inward extent of the arms 136. The primary retaining member 138 includes an upwardly extending guide wall 146 which at its upper end is in sliding engagement with a guide plate 148. The guide plate 148 is held in a fixed position relative to the support surface by the horizontal support arm 13 of the holder 11 shown in FIGS. 1A and 1B. A plurality of expanded springs 150 extending between horizontal support arm 13 and primary retaining member 138 urges primary retaining member 138 and retained sphere 130 upwards. A set of six actuating rods 152 depend from housings 153 which are affixed to the top of the guide plate 148. Each actuating rod 152 is held horizontally in guide holes 154. Both the actuating rods 152 and guide holes 154 have rectilinear profiles, as best seen in FIG. 14A, such that the actuating rods 152 are freely slidable vertically, but restricted against twisting about their longitudinal axes. Hydraulic fluid is supplied through hydraulic lines 156 to the top of each housing 153 to supply the actuating force to power the downward movement of the actuating rod 152 by increasing the pressure bearing on a piston 160 at the top of the actuating rod 152. A compression spring 162 coiled around the actuating rod 152 is compressed by the piston 160 during downward movement of the actuating rod 152 and expands to return the actuating rod 152 to its beginning position upon removal of the hydraulic pressure above the piston 160. A curved groove 164 at the lower end of the actuating rod 152 and is brought into contact with one of the legs 132 extending from the sphere 130 upon downward progression of the actuating rod 152. The downward extending edges 166 of the groove 164 embrace the leg 132 and help prevent lateral slippage during a step.

With continuing reference to FIG. 12, a hydraulic control system includes a hydraulic central chamber 170 in the center part of the guide plate 148. A central piston 172 is slidably disposed in the central chamber 170. A central piston shaft 174 depending from the central piston 172 is slidably retained in a center hole 176 which extends from the bottom of the guide plate 148 to the central chamber 170. A downward-facing lower surface 178 of the central piston shaft 174 rests in sliding engagement on the convex top portion of the sphere 130. Springs 150, by urging the primary retaining member 138 and sphere 130 upward, help maintain good contact between lower surface 178 and sphere 130. With additional reference to FIG. 14A, six hydraulic satellite chambers 180 in the guide plate 148 surround and are in hydraulic communication with the central chamber 170 via channels 182. A satellite piston 184 is in sliding disposition in each of the satellite chambers 180. An outwardly extending shaft 186 projects from each of the satellite pistons 184 through ports 188 into one of the guide holes 154 for the actuating rods 152. Each actuating rod 152 includes an inwardly-facing lateral recess 190 disposed in direct opposition to the shaft 186.

Figure 13A:
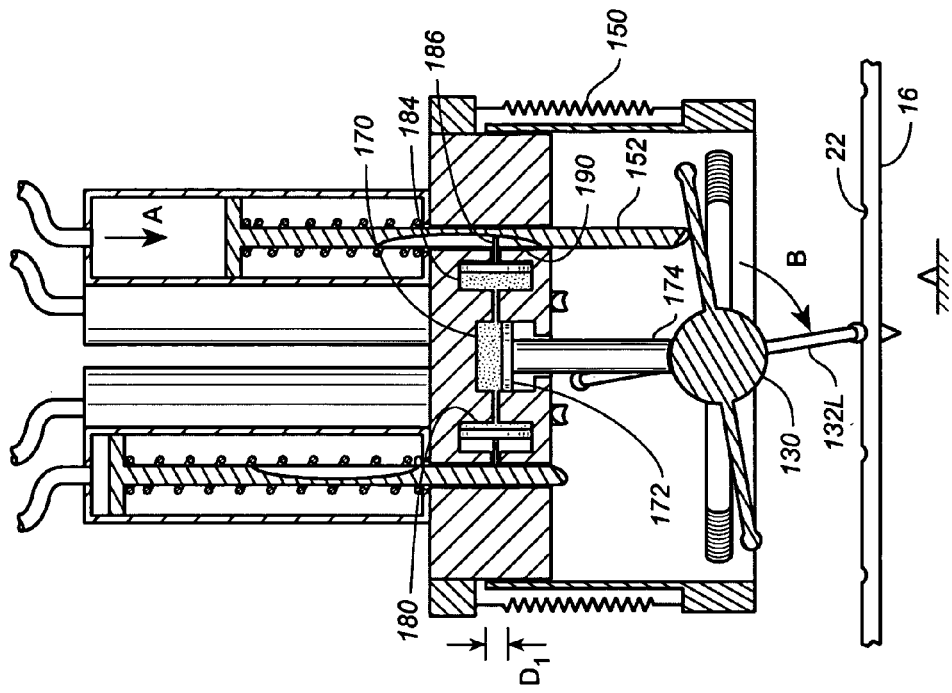
FIGS. 13A-13D are a series of sectional views of the embodiment of the invention shown in FIG. 12 showing the elements of the invention at various points throughout a step of movement.
Figure 13B:
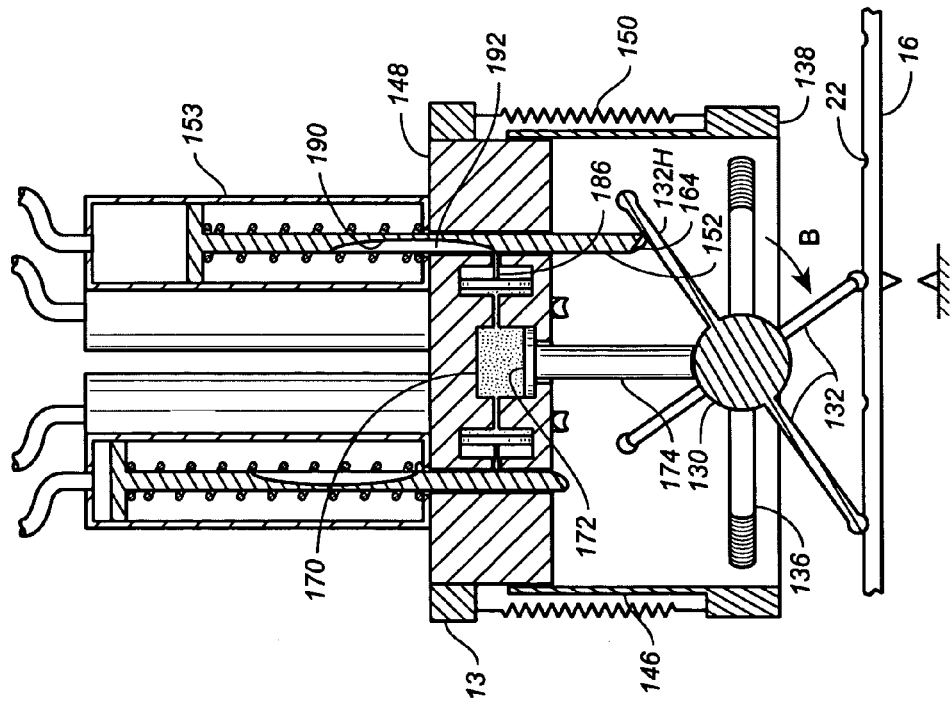
Figure 14B:
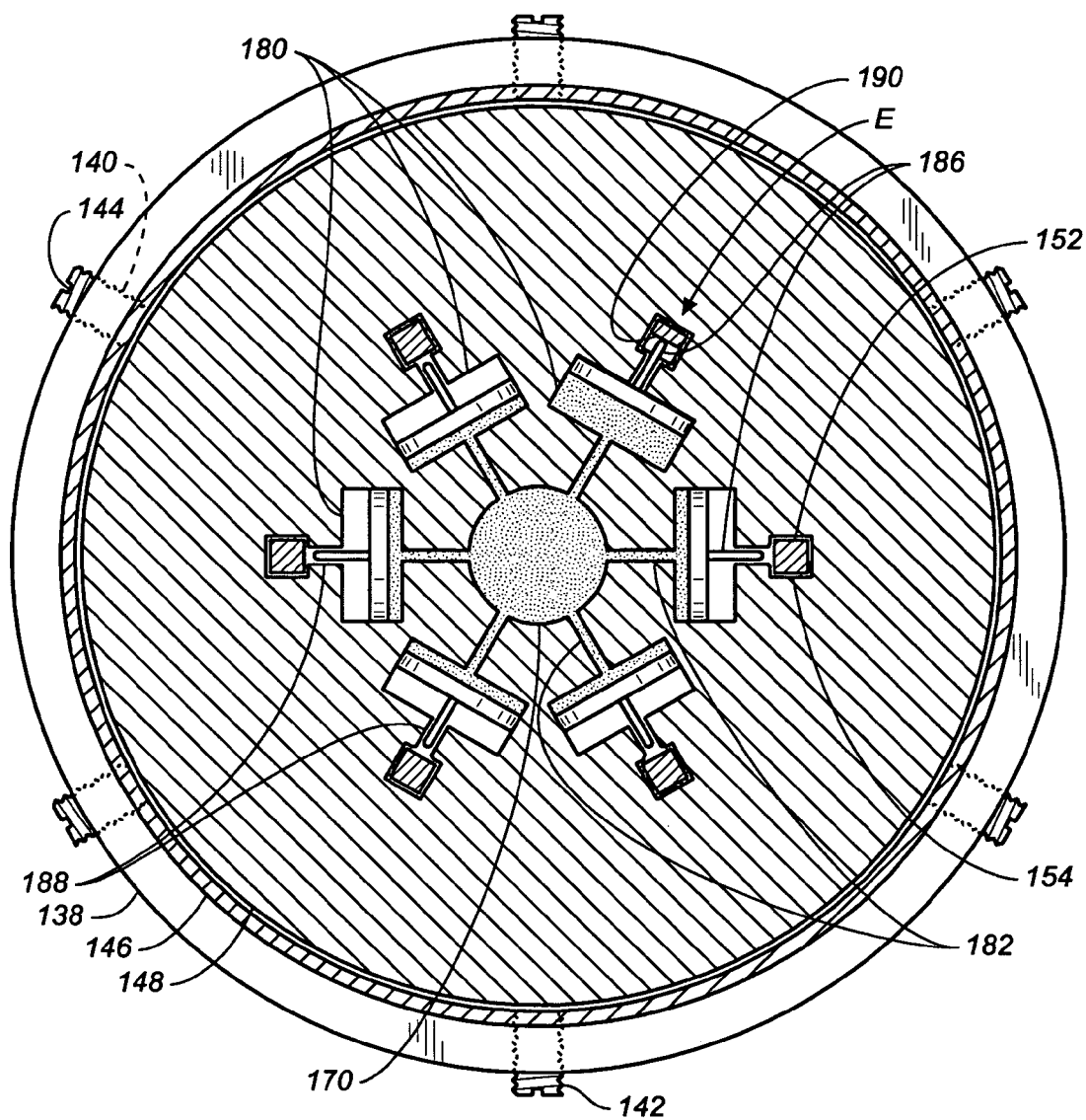
FIG. 14B is a sectional view taken along lines 14B-14B of FIG. 13C similar to the view shown in FIG. 14A but with one of the satellite pistons shown in the extended position.

As seen in FIG. 13A, at the beginning of a step according to the illustrated embodiment the actuating rod 152 above one of the upwardly extending "high" legs 132H has descended from the rest position shown in FIG. 12 to a beginning contact position in which groove 164 is first brought into contact with leg 132H. It will be readily apparent that three of the actuating rods 152 are in superposition to each of the three high legs 132H although only two of each are shown in FIG. 13A. In the beginning contact position of actuating rod 152, the lower edge 192 of the lateral recess 190 is disposed barely above the adjacent shaft 186. Further downward movement of the actuating rod 152, indicated by arrow A in FIG. 13B, pushes on the selected high leg 132H which rotates the sphere 130 and legs 132 in the direction indicated by arrow B. Similar to the first embodiment discussed above, continued downward movement of the actuating rod 152 causes the lower legs 132L initially disposed below the selected high leg 132H to walk underneath the sphere 130, moving the work surface laterally, and increasing the height of the sphere 130 and primary retaining member 138 by distance $D_1$. In addition, the height of central piston shaft 174 and central piston 172 are increased, thereby increasing the hydraulic pressure in the central chamber 170. Increased pressure in cental chamber 170 is communicated to the satellite chambers 180 causing the satellite piston to move outward pushing the shaft 186 into the laterally-facing recess 190. The extent of outward movement of the shaft 186 is proportional to the increased height of the sphere 130 and, hence, the pressure in the central chamber 170 such that as the height changes the length of projection of the shaft 186 follows the curvature of the recess 190. FIG. 14B shows the shaft 186 adjacent the actuating rod 152 and guide hole 154, generally indicated at E, extending from the satellite chamber 180 into the recess 190.

Figure 13C:
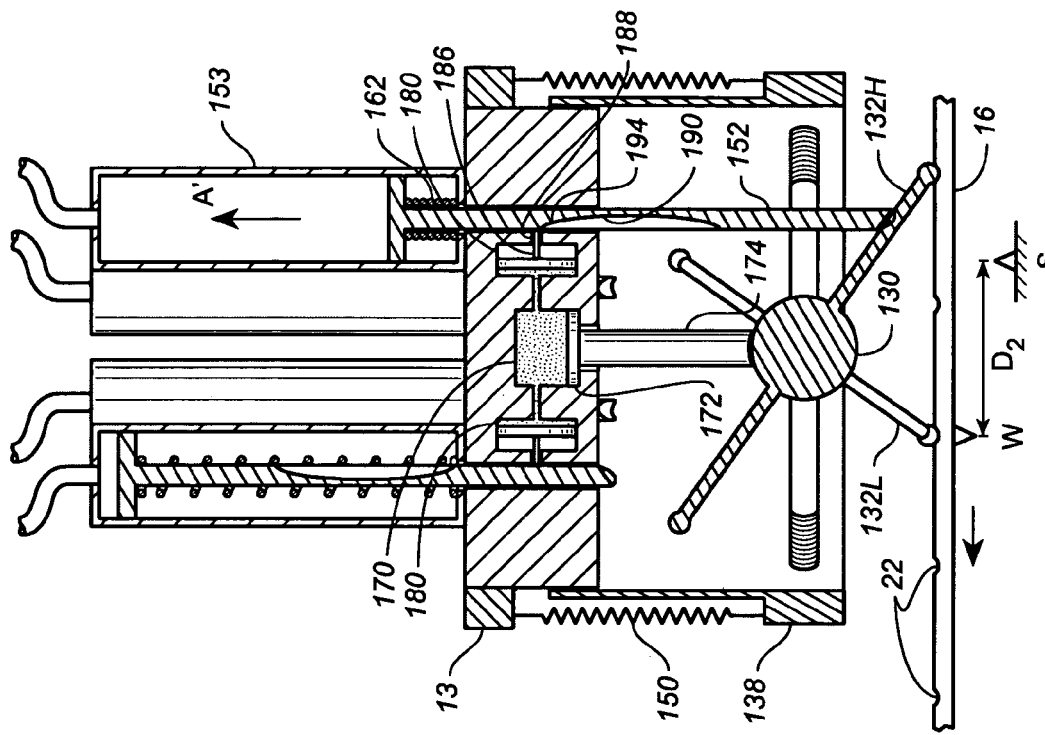

As the actuating rod 152 continues to move further downward in the direction indicated by arrow A, as seen in FIG. 13C, the work surface 16 is moved further horizontally and the sphere 130 and legs 132 rotate past the halfway point of the step such that their height begins to drop. Simultaneously, the recess 190 moves beyond its midpoint, wherein it has a maximum depth, such that its depth begins to decrease, thereby beginning to press the shaft 186 inwards.

This increases pressure in the satellite chamber 180 which increase is communicated to the central chamber 170. Increased pressure in the central chamber 170 pushes down on the piston 172 and central piston shaft 174 in proportion to the falling height of the sphere 130. The piston 172 and piston shaft 174 thus follow the sphere 130 as its height falls during the second half of the step and continued downward movement of the actuating rod 152 ensures smooth and continuous contact between the lower edge 178 of the central piston shaft 174 and the rotating, falling sphere 130. This is of advantage because as the sphere 130 is rotated past the halfway point of the step it will tend to fall under the weight of gravity. The increased forces therefore bearing on the sphere 130 are transmitted to the distal ends 196 of the lower legs 132L which are translated in part into lateral forces which tend to cause the distal ends 196 to jump out of the dimples 22 in the work surface 16. The continuous application of controlled downward pressure by the central piston shaft 174 counteracts this tendency by controlling and mitigating the tendency of the sphere 130 and lower legs 132L to jump upwards.

Figure 13D:
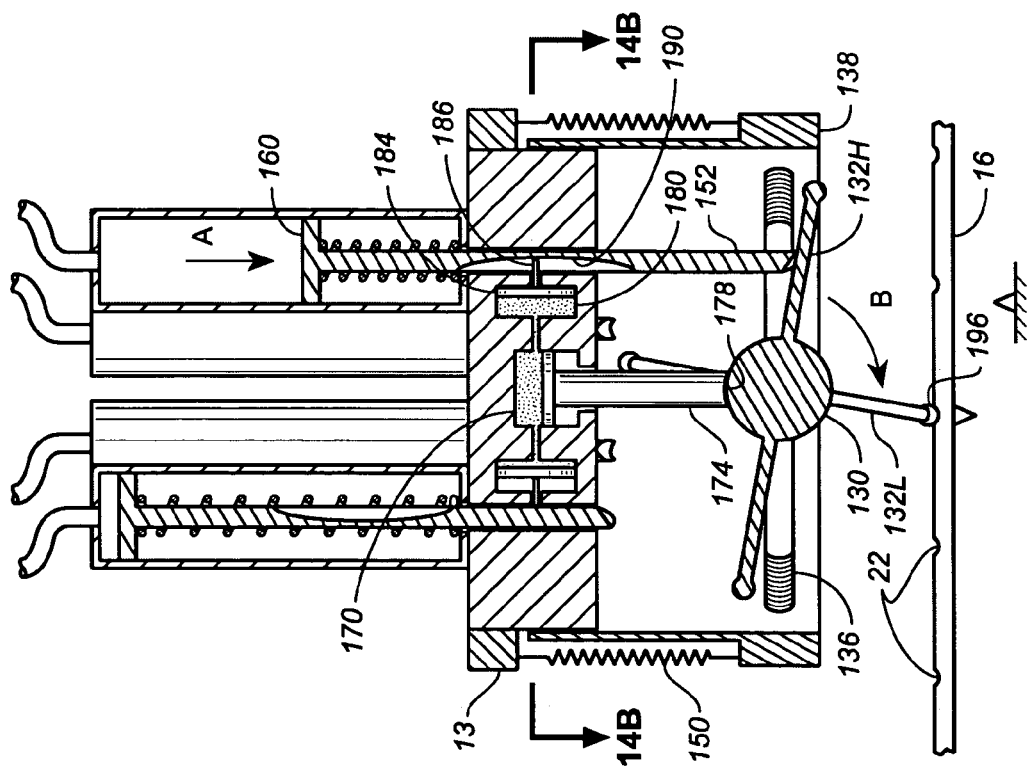

FIG. 13D shows the actuating rod 152 in a fully extended position. Having rotated the sphere 130 and legs 132 through a full step, the high leg 132H is now indexed in one of the dimples 22 in the work surface 16 and the work surface has moved laterally a distance $D_2$ indicated by the separation of support surface reference point S and work surface reference point W. At the completion of a step and full extension of the actuating rod 152, the top edge 194 of the recess 190 has descended just beyond the adjacent shaft 186 and has pressed the latter completely back into the port 188. It will be seen that the height of the sphere 130 has returned to its beginning position as shown in FIG. 13A, that the central piston shaft 174 and central piston 172 have also returned to their beginning positions, and that pressure in the hydraulic chambers 170, 180 has returned to beginning levels. Therefore, once the hydraulic pressure in the housing 153 has been released, the actuating rod 152 may be returned to its beginning, rest position, indicated by arrow A', by expansion of spring 162 unimpeded by inward encroachment by shaft 186.

A sequential stepped movement staging device as described above is relatively simple to manufacture, is capable of moving a horizontal work surface to numerous positions in order to stage a plurality of work sites for performance of a task, and can function under harsh and challenging conditions.

There have thus been described certain preferred embodiments of a sequential stepped movement staging device. While preferred embodiments have been described and disclosed, it will be recognized by those with skill in the art that modifications are within the true spirit and scope of the invention. The appended claims are intended to cover all such modifications.

I claim:

1. A step-and-repeat mechanism for moving a work surface across a support surface, the mechanism comprising:
    a rigid sphere having six legs extending radially along three orthogonal axes, each of said legs having a distal end, said distal end having a convex surface,
    a holder for retaining said sphere in a fixed location relative to the support surface,
    a work surface disposed on the support surface, said work surface having an array of upwardly facing dimples, each dimple having a concave curvature corresponding to said convex surface of said distal ends of said sphere's legs,
    means for sliding movement of said work surface across the support surface,
    said sphere rotatable between a first attitude and a second attitude, in said first attitude a first set of three of said distal ends of said legs indexed in a first set of three of said dimples of said work surface, and in said second attitude a second set of three of said distal ends indexed in a second set of three of said dimples,
    means for application of sufficient force to at least one of said legs to move said sphere from said first attitude to said second attitude, such that said work surface is moved from a first horizontal position to a second horizontal position.

2. The step-and-repeat mechanism of claim 1 wherein:
    said sphere has a center and an outer surface,
    said holder comprises a plurality of concave surfaces each having a curvature conforming to said sphere's outer surface, said concave surfaces disposed in a spaced radial configuration around said sphere in a horizontal plane common with said center of said sphere, said sphere rotatably retained between said concave surfaces.

3. The step-and-repeat mechanism of claim 1 wherein:
    said sphere has a center and an outer surface,
    said holder includes a primary retaining member having a plurality of inwardly extending arms, said arms each having an inner end having an inwardly facing concave surface, said concave surfaces having a curvature corresponding with said sphere's outer surface, said concave surfaces disposed in a spaced radial configuration around said sphere in a horizontal plane common with said center of said sphere, said sphere rotatably retained between said concave surfaces.

4. The step-and-repeat mechanism of claim 3 wherein:
    said primary retaining member has an annular inner surface, said arms extending inwardly from said inner surface.

5. The step-and-repeat mechanism of claim 3 wherein:
    said holder further includes a secondary retaining member fixed in generally parallel superposition to said primary retaining member.

6. The step-and-repeat mechanism of claim 5 further comprising:
    a plurality of guide rods in mutually parallel relation connecting said primary and secondary retaining members.

7. The step-and-repeat mechanism of claim 5 wherein:
    said primary retaining member includes a downwardly depending center bearing member having a lower end, said lower end having a downward-facing lower surface having a concave curvature conforming to said outer surface of said sphere, said lower surface of said bearing member resting on the top of said sphere.

8. The step-and-repeat mechanism of claim 7 wherein:
    said secondary retaining member has an annular outer surface having an outer diameter, and
    said holder further includes an alignment cylinder having an interior diameter slightly larger than said outer diameter of said annular outer surface of said secondary retaining member, said secondary retaining member slidably retained within said alignment cylinder.

9. The step-and-repeat mechanism of claim 7 wherein:
    said holder further includes a guide plate interposed between and generally parallel to said primary and secondary retaining members, said guide plate having a center hole and a plurality of bores surrounding said center hole, said center hole having a diameter slightly larger than said bearing member, said bearing member slidingly disposed in said center hole, and a plurality of guide rods in mutually parallel relation connecting said primary and secondary retaining members, said plurality of guide rods slidingly disposed in said plurality of bores.

10. The step-and-repeat mechanism of claim 9 wherein:
said bores each have a diameter slightly larger than a cross-section of one of said guide rods.

11. The step-and-repeat mechanism of claim 9 further comprising:
means for maintaining sufficient downward force on top of said sphere to prevent any of said distal ends of said legs from jumping out of said dimples during rotation of said sphere from said first to said second attitude.

12. The step-and-repeat mechanism of claim 9 wherein:
said holder further includes a spring coiled around said bearing member between and biased mutually against said guide plate and said secondary retaining member.

13. The step-and-repeat mechanism of claim 9 further comprising:
at least six actuating rods, and wherein
in said first attitude of said sphere said distal end of at least one of said legs is in a high position spaced above said work surface, and in said second attitude of said sphere said distal end of said leg is in a low position seated in one of said dimples,
said guide plate having at least six guide holes each disposed in a vertical plane in common with one of said legs of said sphere, each of said actuating rods received vertically in sliding disposition in one of said guide holes, each said actuating rod having a foot, said foot having a lower surface having a downwardly facing groove extending in parallel alignment with one of said vertical planes, each groove engaging in sliding contact with said distal end of one of said legs of said sphere during downward movement of one of said actuating rods, upon application of a downward biasing force by one of said actuating rods on said distal end of one of said legs said distal end movable from said high position to said low position thereby moving said sphere from said first attitude to said second attitude.

14. The step-and-repeat mechanism of claim 13 wherein:
each said actuating rod having a rectilinear cross-section, and
each said guide hole having a rectilinear cross-section slightly larger than the cross-section of one of said actuating rods.

15. The step-and-repeat mechanism of claim 1 wherein:
each distal end of said legs of said sphere is equally spaced a known distance from every other distal end of said legs to which it is adjacent, and
said array of dimples includes at least one set of dimples arranged in a pattern in which the dimples are equally spaced apart by said known distance.

16. The step-and-repeat mechanism of claim 1 wherein:
each distal end of said legs of said sphere is equally spaced a known distance from every other distal end of said legs to which it is adjacent, and
said array of dimples includes a plurality of sets of dimples, said plurality of sets of dimples including at least one set of dimples arranged in a pattern in which the dimples are equally spaced apart by said known distance.

17. The step-and-repeat mechanism of claim 3 further comprising:
at least six actuating rods,
said holder including a guide plate spaced above and generally parallel to said primary retaining member, said guide plate having at least six guide holes each disposed in a vertical plane in common with one of said legs of said sphere, each of said actuating rods received vertically in sliding disposition in one of said guide holes,
in said first attitude of said sphere said distal end of at least one of said legs has a high position spaced above said work surface, and in said second attitude of said sphere said distal end of said leg has a low position seated in one of said dimples, upon application of a downward biasing force by one of said actuating rods on one of said legs, said distal end movable from said high position to said low position, thereby moving said sphere from said first attitude to said second attitude.

18. The step-and-repeat mechanism of claim 17 further comprising:
said primary retaining member including a downwardly depending center bearing member having a lower end, said lower end having a downward-facing lower surface having a concave curvature conforming to said outer surface of said sphere, said lower surface of said bearing member resting on the top of said sphere,
said sphere having a rest height when in said first and second attitudes, said sphere having an intermediate height variably greater than said rest height during rotation of said sphere from said first to said second attitude,
means for preventing separation of said lower surface of said bearing member from the top of said sphere.

19. The step-and-repeat mechanism of claim 18 wherein:
said means for preventing separation comprises force exerting means for exerting a downwardly biasing force on said bearing member inversely proportional to the height of said sphere.

20. The step-and-repeat mechanism of claim 17 further comprising:
a hydraulic central chamber having a piston, said piston having a downwardly depending central piston shaft having a lower end, said lower end having a downward-facing lower surface having a concave curvature conforming to said outer surface of said sphere, said lower surface of said central piston shaft resting on top of said sphere,
at least six hydraulic satellite chambers in hydraulic communication with said central chamber, each satellite chamber having a satellite piston, said satellite piston having a laterally extending satellite piston shaft,
each actuating rod having a foot, said actuating rod moveable between a top position and a bottom position, in said top position said foot in contact with one of said legs when said distal end of said leg is in said high position, in said bottom position said foot engaged with one of said legs when said distal end of said leg is in said low position,
each actuating rod further having a laterally facing recess having an arced profile,
said sphere having a rest height when in said first and second attitudes, said sphere having an intermediate height variably greater than said rest height during rotation of said sphere from said first to said second attitude, said intermediate height of said sphere moving said central piston shaft into said central chamber thereby hydraulicly exerting pressure on said satellite chambers such that said satellite piston shaft of one of said satellite chambers extends laterally into said recess of one of said actuating rods a length proportional to said intermediate height, said length corresponding with the depth of said recess at said satellite piston shaft during downward movement of said actuating rod between said top and bottom positions.

21. The step-and-repeat mechanism of claim 20 wherein:
said recess of said actuating rod has an inner surface, said satellite piston shaft engaging in continuous sliding contact with said inner surface between rotation of said sphere from said first to said second attitude.

22. The step-and-repeat mechanism of claim 21 wherein:
said recess has a middle portion, and a maximum depth in said middle portion, continued downward movement of said actuating rod from a point where said middle portion of said recess is engaged with said extended satellite piston shaft biasing said satellite piston shaft towards said satellite chamber thereby increasing hydraulic pressure in said central chamber such that said central piston shaft is biased downwards against the top of said sphere.

\* \* \* \* \*